US008813492B2

(12) United States Patent
Hansen et al.

(10) Patent No.: US 8,813,492 B2
(45) Date of Patent: Aug. 26, 2014

(54) INTERNAL COMBUSTION ENGINE AND SUPERCHARGER

(75) Inventors: Craig N. Hansen, Plymouth, MN (US); Paul C. Cross, Shorewood, MN (US)

(73) Assignee: Hansen Engine Corporation, Plymouth, MN (US)

( * ) Notice: Subject to any disclaimer, the term of this patent is extended or adjusted under 35 U.S.C. 154(b) by 1146 days.

(21) Appl. No.: 12/587,800

(22) Filed: Oct. 14, 2009

(65) Prior Publication Data

US 2011/0083432 A1   Apr. 14, 2011

(51) Int. Cl.

| | |
|---|---|
| *F02B 33/44* | (2006.01) |
| *F01C 11/00* | (2006.01) |
| *F02B 33/38* | (2006.01) |
| *F04C 28/12* | (2006.01) |
| *F04C 18/16* | (2006.01) |
| *F02D 23/00* | (2006.01) |
| *F02D 41/00* | (2006.01) |

(52) U.S. Cl.
CPC ............... *F02B 33/38* (2013.01); *F01C 11/008* (2013.01); *Y02T 10/17* (2013.01); *F04C 28/12* (2013.01); *Y02T 10/144* (2013.01); *F02B 33/44* (2013.01); *F04C 18/16* (2013.01); *F02D 23/00* (2013.01); *F02D 41/0007* (2013.01)
USPC ........................... 60/611; 123/559.1; 123/564

(58) Field of Classification Search
CPC ...... F02B 33/38; F02B 33/44; F02B 29/0425; F02B 39/04; F02D 23/005; F02D 41/0007; F01C 11/008; F04C 18/16; F04C 28/12; Y02T 10/144; Y02T 10/17

USPC ........ 123/559.1, 564; 418/201.2, 120; 60/611
See application file for complete search history.

(56) References Cited

U.S. PATENT DOCUMENTS

| | | | |
|---|---|---|---|
| 30,157 A | 9/1860 | Roots | |
| 2,201,014 A | 5/1940 | Sheerer | |
| 2,311,936 A * | 2/1943 | Elfes et al. | ..................... 123/564 |
| 2,519,991 A | 8/1950 | Lysholm | |
| 2,578,196 A | 12/1951 | Montelius | |
| 2,849,862 A * | 9/1958 | Dietrich et al. | ............ 60/39.281 |
| 3,088,658 A | 5/1963 | Wagenius | |
| 3,088,659 A * | 5/1963 | Nilsson et al. | ................. 418/159 |
| 3,151,806 A | 10/1964 | Whitfield | |
| 3,303,348 A | 2/1967 | Cox et al. | |
| 3,673,796 A | 7/1972 | Weick et al. | |
| 3,933,137 A | 1/1976 | Uno et al. | |

(Continued)

FOREIGN PATENT DOCUMENTS

| | | | | |
|---|---|---|---|---|
| EP | 0 326 663 A2 | 8/1989 | | |
| EP | 326663 A2 * | 8/1989 | .............. | F02B 33/36 |

(Continued)

*Primary Examiner* — Thomas Denion
*Assistant Examiner* — Patrick Maines
(74) *Attorney, Agent, or Firm* — Richard John Bartz

(57) ABSTRACT

A diesel or diesel-like internal combustion engine drivably connected to a variable internal compression ratio supercharger that supplies varying amounts of air to the engine responsive to the load requirements of the engine. The supercharger has a pair of rotors concurrently driven by the engine to move air to the engine. A slide assembly associated with screw rotors is movable with a controller relative to the rotors to bypass air to atmosphere and regulate the amount of air and pressure of the air compressed by the screw rotors to the engine to increase the engine's efficiency.

25 Claims, 20 Drawing Sheets

(56) References Cited

U.S. PATENT DOCUMENTS

| | | | |
|---|---|---|---|
| 4,074,957 A * | 2/1978 | Clarke et al. | 418/195 |
| 4,388,048 A * | 6/1983 | Shaw et al. | 417/310 |
| 4,453,900 A | 6/1984 | Schibbye et al. | |
| 4,498,849 A * | 2/1985 | Schibbye et al. | 417/299 |
| 4,508,089 A | 4/1985 | Baumgartner et al. | |
| 4,575,323 A * | 3/1986 | Yoshimura | 418/201.2 |
| 4,597,726 A | 7/1986 | Soderlund et al. | |
| 4,667,646 A * | 5/1987 | Shaw | 123/559.1 |
| 4,744,734 A * | 5/1988 | Sowards | 417/440 |
| 4,802,457 A | 2/1989 | Oscarsson | |
| 4,873,961 A * | 10/1989 | Tanaka | 123/564 |
| 4,932,368 A * | 6/1990 | Abe et al. | 123/470 |
| 4,951,638 A | 8/1990 | Tsubol | |
| 4,991,562 A | 2/1991 | Chujo | |
| 4,995,347 A * | 2/1991 | Tate et al. | 123/65 BA |
| 5,018,948 A * | 5/1991 | Sjte et al. | 417/302 |
| 5,090,392 A * | 2/1992 | Nakano et al. | 123/564 |
| 5,108,269 A | 4/1992 | Glanvall | |
| 5,115,788 A * | 5/1992 | Sasaki et al. | 123/559.3 |
| 5,117,799 A | 6/1992 | Suzuki et al. | |
| 5,127,386 A * | 7/1992 | Sowards | 123/564 |
| 5,186,081 A | 2/1993 | Richardson et al. | |
| 5,203,309 A | 4/1993 | Goto et al. | |
| 5,203,683 A | 4/1993 | Yoshikawa et al. | |
| 5,207,206 A | 5/1993 | Takahashi et al. | |
| 5,228,368 A | 7/1993 | Kato et al. | |
| 5,269,667 A | 12/1993 | Mauney | |
| 5,347,972 A | 9/1994 | Sandou et al. | |
| 5,411,387 A * | 5/1995 | Lundin et al. | 418/201.2 |
| 5,791,315 A * | 8/1998 | Riach et al. | 123/564 |
| 5,979,168 A | 11/1999 | Beekman | |
| 6,022,203 A | 2/2000 | Kirsten | |
| 6,055,967 A * | 5/2000 | Miyagi et al. | 123/564 |
| 6,241,498 B1 | 6/2001 | Hansen et al. | |
| 6,401,012 B1 | 6/2002 | Aoki et al. | |
| 6,604,514 B1 | 8/2003 | Englund et al. | |
| 6,695,591 B2 | 2/2004 | Grimmer et al. | |
| 6,901,324 B2 | 5/2005 | Rose et al. | |
| 6,931,850 B2 | 8/2005 | Frank et al. | |
| 7,076,954 B1 | 7/2006 | Sopko et al. | |
| 7,137,253 B2 | 11/2006 | Furman et al. | |
| 7,174,714 B2 | 2/2007 | Algrain | |
| 7,644,585 B2 | 1/2010 | Haugen | |
| 7,726,285 B1 * | 6/2010 | Hansen et al. | 123/559.1 |
| 7,748,437 B2 | 7/2010 | Rohelkee | |
| 7,752,840 B2 | 7/2010 | Stewart | |
| 8,459,963 B2 * | 6/2013 | Pileski | 417/312 |
| 2002/0116925 A1 | 8/2002 | Hampson et al. | |
| 2003/0223897 A1 * | 12/2003 | Ferentinos | 418/9 |

FOREIGN PATENT DOCUMENTS

| | | | | |
|---|---|---|---|---|
| GB | 2230817 A | | 10/1990 | |
| JP | 63170524 A | * | 7/1988 | F02B 37/04 |
| JP | 11082341 A | * | 3/1999 | F04C 18/16 |

* cited by examiner

INTERNAL COMBUSTION ENGINE AND SUPERCHARGER

CROSS REFERENCE TO RELATED APPLICATION (None.)

FIELD OF THE INVENTION

The technology of the invention relates to internal combustion engines equipped with superchargers for supplying air to the engines according to the requirements of the engines to increase efficiency and performance of the engines.

BACKGROUND OF THE INVENTION

Air displacement devices have been developed and used to increase the supply of air and fuel to internal combustion engines to boost engine horsepower. An example of an air displacement device is the "Roots blower" shown by P. H. Roots in U.S. Pat. No. 30,157 and G. Scheerer in U.S. Pat. No. 2,201,014. Each of these devices has a belt-driven shaft that drives two close-clearance rotors. The rotating rotors during each rotation sweep out a specific volume of air to an air receiver, such as an internal combustion engine. The rotational speed of the rotors largely determines the unthrottled volume of air discharged by the device.

C. N. Hansen and P. C. Cross in U.S. Pat. No. 6,241,498 disclose a supercharger having cooperating rotors drivably connected to an internal combustion engine for delivering an air/fuel mixture to the combustion chamber of the engine. The rotors have semi-cylindrical pockets and protrusions that continuously move air through the supercharger. The unthrottled volume of air discharged by the supercharger depends on the operating speed of the engine that drives the supercharger. The unthrottled volume of air discharged by the supercharger operating at a constant speed varies little. There are no air flow controls to regulate air flowing into and out of the supercharger.

J. E. Whitfield in U.S. Pat. No. 3,151,806 discloses a screw type compressor having a pair of rotors rotatably mounted on a housing. Volume control valves are located on the fluid inlet side of a fixed valve spacer. Compression control valves located on the fluid outlet side of the fixed valve spacer regulate the size and length of the fluid discharge outlet. Screws connected to the valves are used to adjust the positions of the valves to provide desired variations in fluid delivery volume and internal compression ratio.

F. Soderlund and K. Karlsson in U.S. Pat. No. 4,597,726 disclose a screw compressor having two rotors rotatably mounted on a housing for mutual meshing engagement. The pressure ratio and the capacity of the compressor is regulated with two slides mounted for independent axial movements. One slide regulates the capacity of the compressor. The other slide regulates the built-in volume ratio of the compressor.

N. Tsubol in U.S. Pat. No. 4,951,638 discloses a screw type supercharger having a pair of female and male rotors. Gears mounted on one end of each rotor synchronize rotation of the rotors so that they do not contact each other. One rotor is connected to an internal combustion engine which provides input power to the supercharger. The supercharger does not include intake air flow controls that regulate the volume of air discharged to an internal combustion engine intake manifold.

J. Oscarsson in U.S. Pat. No. 4,802,457 discloses an internal combustion engine equipped with a supercharger having rotors located in compression chambers. An air throttle device associated with the air inlet side of the supercharger is operated by the foot accelerator when the engine is only partially loaded to restrict the air flow into the rotor chamber.

A. B. Riach in U.S. Pat. No. 5,791,315 discloses a spark ignition internal combustion engine coupled to a supercharger having an air inlet port control for controlling the intake air into the supercharger. The control includes an inlet port valve which is open at full engine load and progressively closes when the engine load is progressively reduced and an air flow throttle valve which is open at full engine load and progressively closes when the load is progressively reduced.

G. Kirsten in U.S. Pat. No. 6,022,203 discloses a variable displacement screw-type compressor having a pair of rotors operable to move fluid under compression from an inlet channel to an outlet channel. Housing segments associated with the rotors control the internal compression ratio of the compressor. Control cams rotated with a stepper motor displace the housing segments against the bias of springs.

Four stroke diesel engines do not require blowers or superchargers to supply compressed air for starting and continuous operation. In a four stroke diesel engine the first down stroke of the piston draws air into the cylinder. The air in the cylinder is compressed on the upstroke above the ignition temperature of the fuel. Near the top of the stroke of the piston a jet of fuel begins to spray into the cylinder and is auto-ignited by the hot compressed air in the cylinder. The rapid pressure rise of the trapped gas due to the rapid burning of the fuel moves the piston down during the working stroke. The subsequent upstroke drives the exhaust gases and particulates out of the cylinder through an exhaust valve to an exhaust manifold. The output torque of a four stroke diesel engine is controlled by varying the amount of fuel injected and burned in the cylinder. The volume of air in a naturally aspirated diesel engine cylinder during each air intake stroke varies little with the speed or torque of the engine but does limit the practical maximum quantity of fuel that can be injected per cycle.

SUMMARY OF THE INVENTION

The invention comprises an internal combustion engine having an air intake manifold accommodating air near or above atmospheric pressure operably connected to a load, such as a motor vehicle drive system, pump or an electric generator, combined with a variable internal compression ratio and air flow rate supercharger for supplying varying amounts of air to the engine. Examples of this internal combustion engine are a diesel engine or a spark-assisted engine. Other engines that generally operate without throttled intake manifolds hereinafter referred to as diesel-like engines are further examples of the internal combustion engines of this invention. The supercharger in a first operation or case has the rate of air flow delivered to the engine matched with the rate of air flow drawn by the engine so that no air pressure rise occurs in the air intake manifold of the engine when naturally aspirated power output of the engine is adequate to meet the load requirement of the engine. In a second operation or case of the supercharger, a proportional amount of air is compressed to a matching air pressure and introduced to the engine's boosted intake manifold. This results in the most efficient operation of the engine from no boost to varying levels of boost. The supercharger is a positive air displacement mechanism or gas compressor powered by the engine to improve the power to weight ratio of the engine. Other power devices, such as electric motors, can operate the air displacement mechanism. The gas compressor is operable to move gas selectively, a first portion of the gas to a first location and a second portion of the gas to a second location. In the case of constant speed application, the supercharger has an air flow control that regulates the volume and pressure of air compressed by the supercharger to the engine to maintain the speed of the engine substantially constant when driving variable loads better than a smaller displacement engine could without the supercharger. The supercharger operates to increase the flow of the air to the cylinders of the engine responsive to the power requirements of the engine improving the engine's overall efficiency. Air is moved through the supercharger with a pair of rotating screws or rotors or one female and one male rotor having cooperating helical grooves and protrusions or lands that create positive air flow to the engine. The twin rotors are a durable part of or component of a compact and efficient air compressor that delivers air to the engine to achieve the performance required by the engine. The volume of air flow discharged by the supercharger is regulated by controlling the effective air trapping length of the twin rotors. One or more slide assemblies associated with the rotors control the air moving and compressing operation of the supercharger. The air flow control is a movable slide assembly in one embodiment of the supercharger comprising an elongated slide or member movably positioned adjacent one side of a rotor to regulate the amount of air trapped by the rotating rotors and to vent excess air to atmosphere thereby cooling the rotors and adjacent housing and increasing the pumping efficiency of the supercharger. An actuator connected to the member functions to move the member between maximum air bypass, partially air bypass and minimum air bypass positions relative to the rotors. When the member is in the maximum air bypass position, only the naturally aspirated volume of air is pumped by the supercharger into the cylinders of the engine. The volume of air supplied to the engine by the supercharger is changed by progressively moving the member between maximum air bypass, partially air bypass and minimum air bypass positions. A controller operates the actuator to control the volume of air supplied to the engine according to the speed and load requirements of the engine. A processor responsive to signals representing the speed and load on the engine generates command signals that coordinate the controller and a module that regulates the amount of fuel injected into the engine's cylinders and the start of the injection timing. A manually operated control device can be used to provide operator control input to the processor to operate the actuator to control the operating position of the slide member. An air mass flow sensor responsive to the flow of air directed by the supercharger to the engine provides additional input to the processor to control the operation of supercharger and introduction of fuel to the engine's combustion cylinders. The variable compression ratio supercharger produces the lowest parasitic losses to the system by minimizing the compression work required of the supercharger to meet the current power requirements of the engine. The supercharger operates to use intake air to remove heat generated by the supercharger, bypassing the cooling excess air to atmosphere. The bypassed air need not recirculate back to the air intake of the supercharger. In this case, the excess air discharged to atmosphere results in internal cooling of the supercharger components and lower air discharge temperature of compressed air delivered to the engine. The implications of these cooling effects include smaller intercoolers, lower air intake charge temperature, reduced air pressure for a given air mass flow rate, and variable air flow for emissions control schemes.

The invention includes the method of supplying power to a power user, such as motor vehicles, pumps, and electric generators. An air compression fuel ignition engine, such as a diesel engine or an air compression spark assist engine, is drivably connected to the power user which imparts a load on the engine. An air supply from a supercharger is directed to the engine in varying amounts responsive to the power requirements of the engine. The rate of flow of air to the engine is varied at or above the naturally aspirated rate of flow of air to the engine. An amount of fuel is introduced in the air in the combustion chamber at the proper time to meet the power or load requirements of the engine and can be controlled to provide proper combustion and emissions performance. The supercharger is operable to expel a first portion of the volume of uncompressed air generated by the supercharger to atmosphere and direct a second portion of the volume of air generated by the supercharger to the engine. The first portion of air, expelled to atmosphere, is controlled to selectively vary the volume or rate of flow of the second portion of the air directed to the engine. The first portion of air cools the rotors and housing as the air transfers heat generated by the previous compression of air by the rotors. This reduces the temperatures of the second portion of air directed to the engine. The cold starting of the engine is facilitated by providing an air boost to the engine when all the air generated by the supercharger is directed to the combustion chamber of the engine.

An object of the invention is to improve the power to weight ratio of diesel and diesel-like engines. Another object of the invention is to combine a supercharger and a four stroke diesel or diesel-like engine to improve the engine's portability and reduce its size and weight for a given maximum power rating. A further object of the invention is to combine a diesel or diesel-like engine and a positive displacement air supercharger having the ability to efficiently adjust boost air pressure and air mass flow to the engine over the engine operating range to increase the fuel efficiency of the engine and/or alter the engine exhaust emissions.

DESCRIPTION OF THE INVENTION

Figure 1:
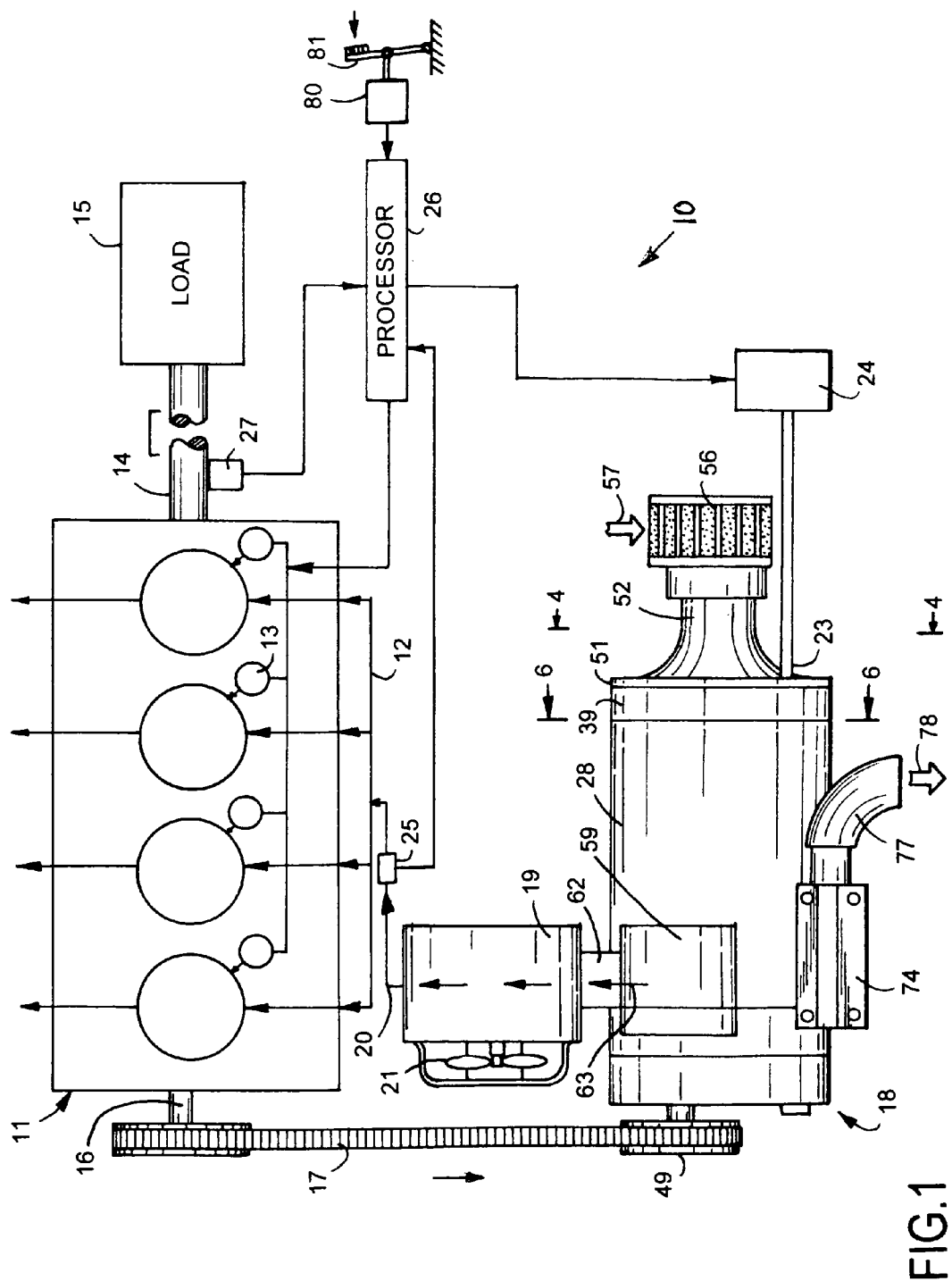
FIG. 1 is a diagram of an internal combustion engine coupled to a load and the supercharger of the invention.

The supercharged internal combustion power unit 10, shown in FIG. 1, is an internal combustion engine 11 having an air intake manifold 12 and a drive shaft 14 operably connected to a load 15. Engine 11 is an air compression ignition internal combustion engine, such as a conventional diesel internal combustion engine, with fuel injectors 13 operable to timely introduce fuel into the engine's combustion chambers. Engine 11 is an internal combustion engine typically using the heat of compressed air to initiate ignition to burn fuel injected into the engine's combustion chambers during the final stage of air compression. Engine 11 includes air compression spark assisted engines and engines that operate near or above atmospheric air pressure in the engine's air intake manifold. These engines are herein referred to as diesel-like engines. Load 15 can be a motor vehicle drive system, a pump, an electric generator or machines drivably coupled to drive shaft 14. A front drive shaft 16 of engine 11 couples a belt and pulley power transmission 17 to a supercharger 18 operable to compress and discharge air into an air cooler or intercooler 19. Transmission 17 can alternatively be a chain and sprocket or a gear drive. Other types of devices, such as electric motors, can be used to operate supercharger 18. A vehicle motion or motor driven fan 21 directs atmospheric air through air cooler 19 to lower the temperature of the boosted air in air cooler 19 which is discharged into a conduit 20 connected to engine intake manifold 12. An air mass flow sensor 25 coupled to conduit 20 provides electric signals to a processor 26. Supercharger 18 includes an air flow control slide assembly 22, shown in FIGS. 7, 8 and 9, having an actuator 23, shown as a linear shaft, operable to control maximum air bypass, partially air bypass and minimum air bypass positions of slide assembly 22 which regulates air bypassed to atmosphere and the supply of air to intake manifold 12 of engine 11. A controller 24, such as a rotary servomotor or linear actuator, coupled to actuator 23 operates actuator 23 to move slide assembly 22 between open, closed and intermediate positions, herein referred to as maximum air bypass, minimum air bypass and partially air bypass positions, to vary the volume of air bypassed to atmosphere and the remainder directed by supercharger 18 to the combustion chamber of engine 11 responsive to the operating requirements of the engine. The cold starting of the engine is facilitated when the slide assembly 22 is in the minimum air bypass position whereby the greatest amount of air boost is delivered to the combustion chambers of the engine. The air boost assists in the cold start of the engine. A control processor or microprocessor 26 is wired to controller 24, air mass flow sensor 25, and a sensor 27 that provides electric signals corresponding to the rotational speed of drive shaft 14 of engine 11. An operator control device 80 coupled to foot pedal 81 is used to provide processor 26 with operator demand electric signals responsive to actuation of foot pedal 81 by the operator of engine 11. Foot pedal 81 is manually moved to operate control device 80 to generate electric signals for processor 26 to increase the operating speed and power output of engine 11. Other types of controls can be used to operate control device 80. The signals generated by sensor 27 are processed by the electronic components of processor 26 to provide control or command signals that operate controller 24 which in turn starts actuator 23 to change the position of slide assembly 22 that regulates the volume of air compressed by supercharger 18 and delivered to engine 11. Processor 26 is also a control module that controls the amount of fuel injected into the cylinders and the fuel injection timing and can determine optimum boost air flow and engine RPM for best fuel economy to meet the load requirement.

Figure 2:
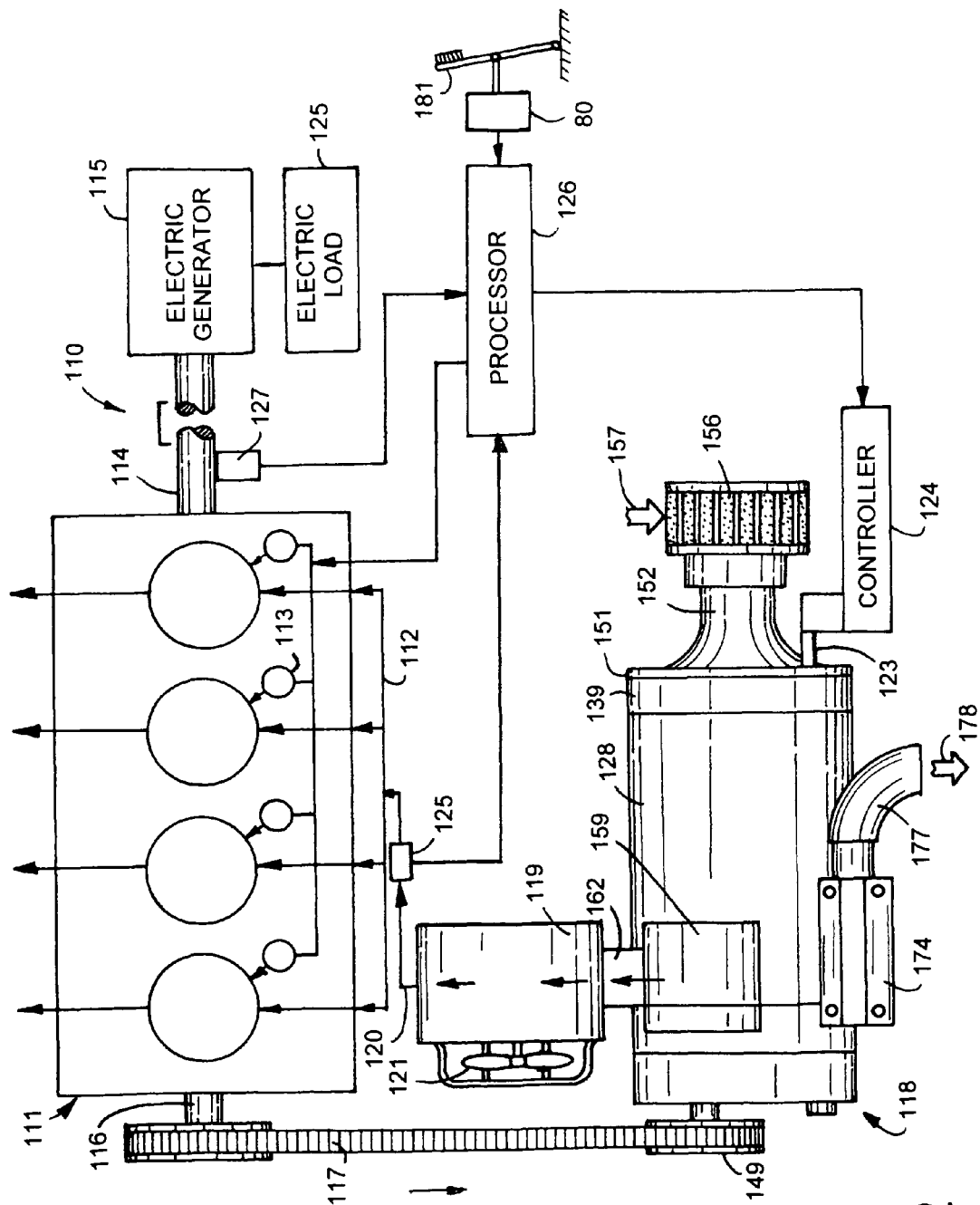
FIG. 2 is a diagram of an internal combustion engine coupled to an electric generator and the supercharger of the invention.

A first modification of the supercharged internal combustion power unit 110, shown in FIG. 2, includes a diesel-like engine or a conventional diesel engine 111 having a drive shaft 114 connected to an electric generator 115. Generator 115 is wired to an electric load 125. A supercharger 118 driven by engine 111 is controlled with a processor 126 and controller 124 operable to maintain engine 111 to operate at a set speed during changes of the electric load subjected to the electric generator 115. Engine 111 can operate at varying speeds to operate electric generator 115. The parts of supercharger 118 that correspond to the parts of supercharger 18 have the same reference numbers with the prefix 1.

Figure 6:
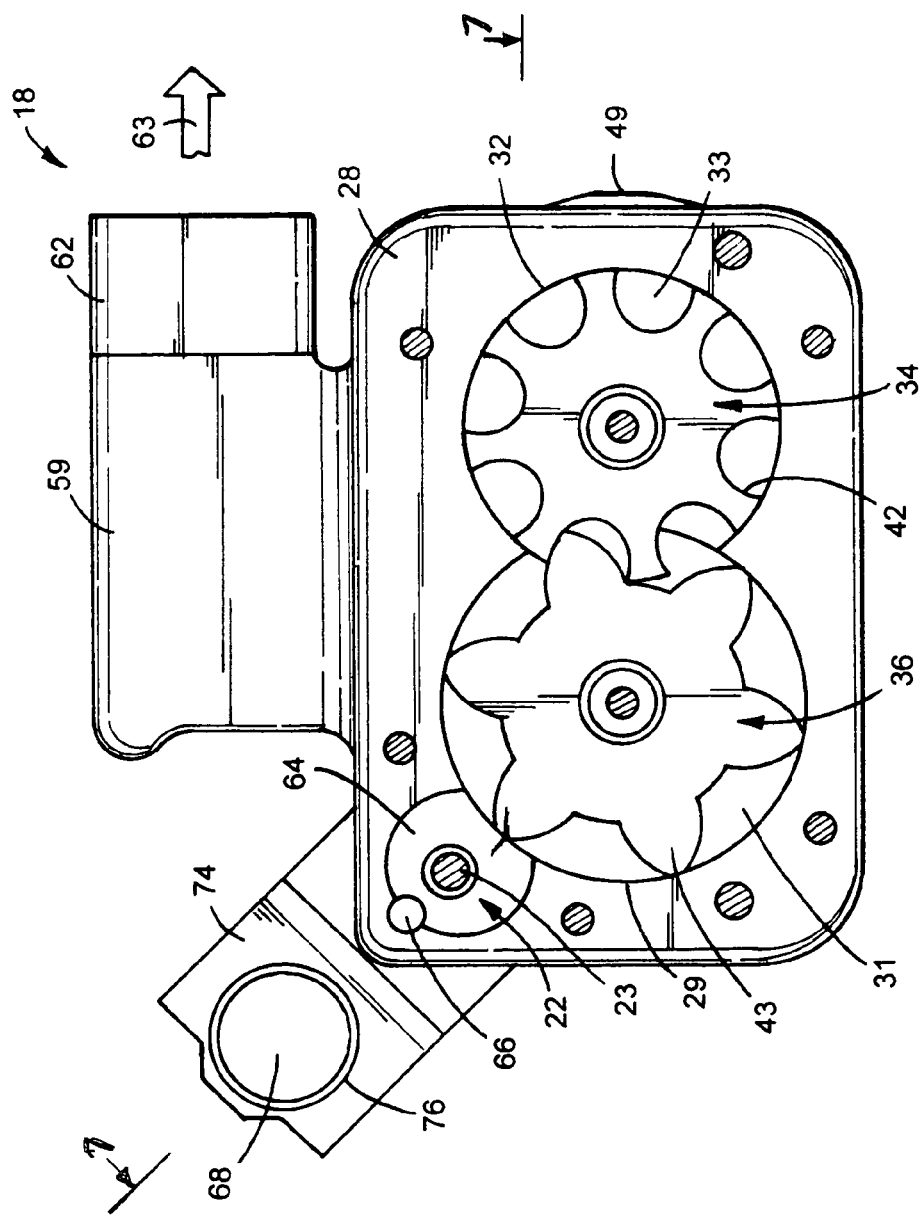
FIG. 6 is an enlarged sectional view taken along line 6-6 of FIG. 1.
Figure 7:
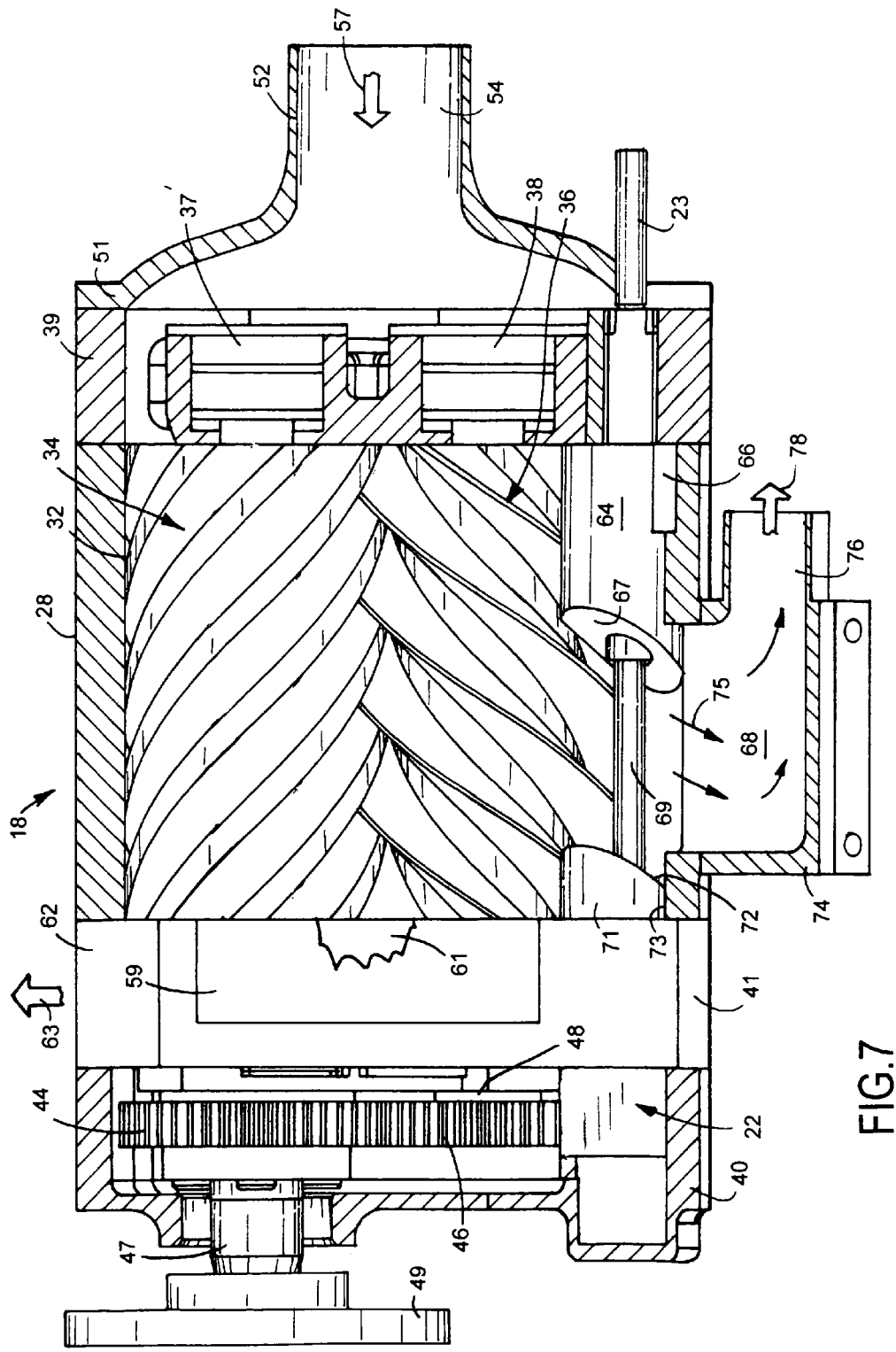
FIG. 7 is a sectional view taken along line 7-7 of FIG. 6 showing the air control slide assembly in a maximum air bypass position for allowing a minimum volume of air to be discharged from the supercharger to the engine.

Supercharger 18, shown in FIGS. 6 and 7, has a housing 28 with a first cylindrical wall 29 surrounding a first cylindrical chamber or bore 31 and a second cylindrical wall 32 surrounding a second cylindrical chamber or bore 33. Chambers 31 and 33 have parallel axes and intersecting adjacent arcuate sections. A female screw or rotor 34 is located along the length of chamber 33. A male screw or rotor 36 is located along the length of chamber 31. Bearings 37 and 38, shown in FIGS. 4, 7 to 9, and 11, support rotors 34 and 36 on end members 39 and 41. Rotor 34 has eight circumferentially spaced helical grooves 42 which mesh with male rotor 36. As shown in FIG. 6, rotor 36 has a number of helical protrusions, vanes or lands 43 projected in radial outward directions from the minor diameter of rotor 36. Each land has convex shaped side walls that are complementary to the shapes of the walls of grooves 42. The sizes, numbers, shapes, helical configuration and extent of grooves 42 and lands 43 can vary. As shown in FIG. 6, rotor 36 has six helical lands 43 which cooperate with the eight helical grooves 42 in rotor 34 to compress and move air in chambers 31 and 33. Other groove and land numbers and sizes can be incorporated into cooperating rotors 34 and 36. Returning to FIGS. 7, 8 and 9, synchronizing gears 44 and 46 connected to rotor shafts 47 and 48 concurrently rotate rotors 34 and 36 in opposite circular directions. Gears 44 and 46 are located within housing 40 attached to end member 41. Shaft 47 is attached to a pulley or sprocket wheel 49 accommodating the endless belt of power transmission 17 drivably coupling engine 11 to supercharger 18 whereby rotors 34 and 36 are rotated in opposite circular directions at speeds related to the rotational speed of the engine's drive shaft 16.

Figure 3:
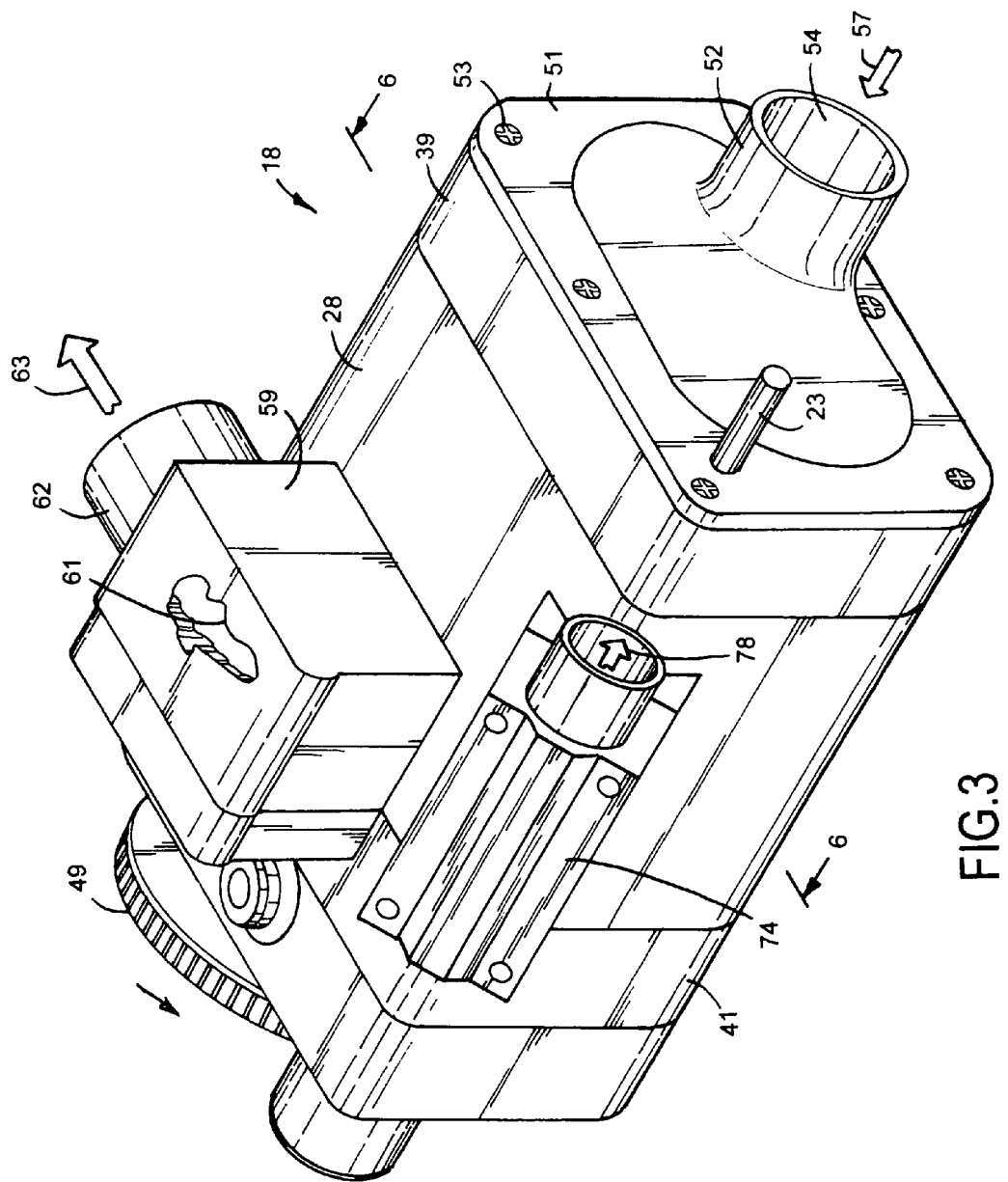
FIG. 3 is an enlarged perspective view of the supercharger in FIG. 1.
Figure 4:
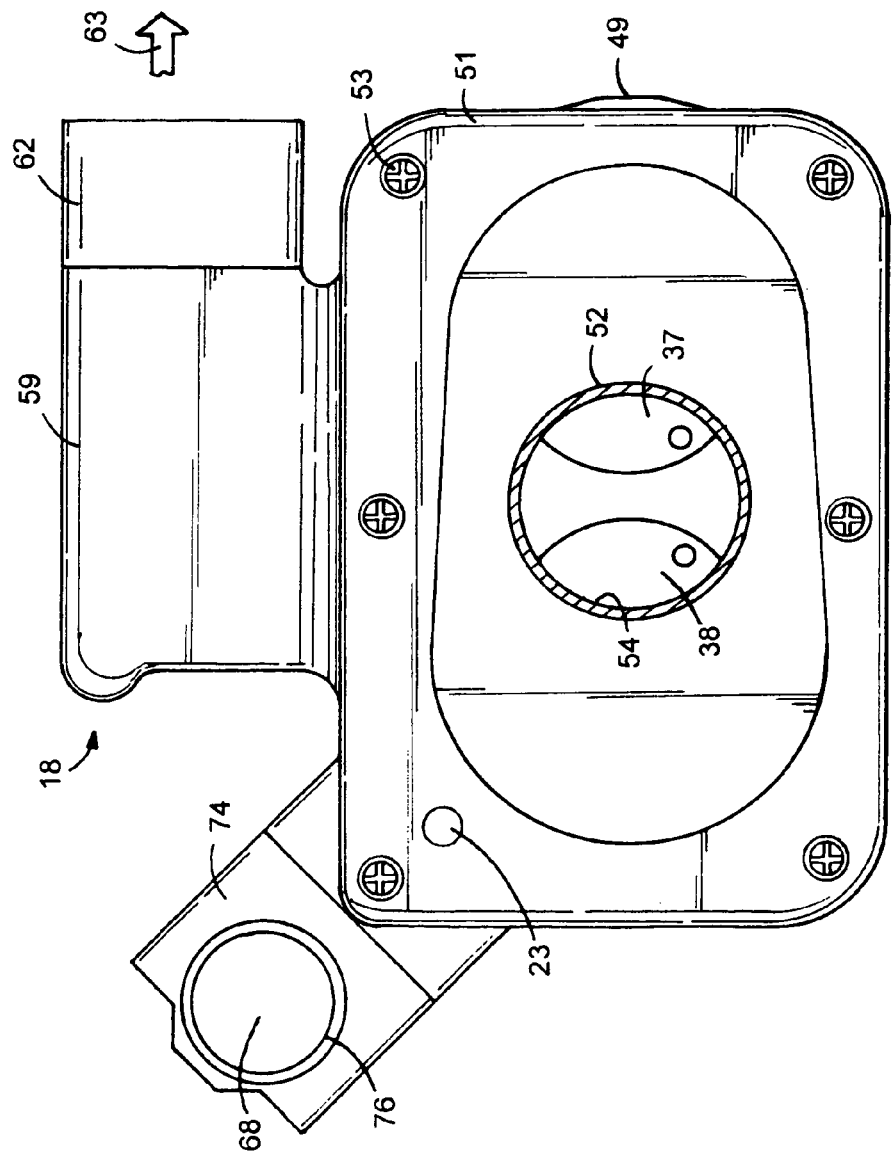
FIG. 4 is an enlarged sectional view taken along line 4-4 of FIG. 1.
Figure 5:
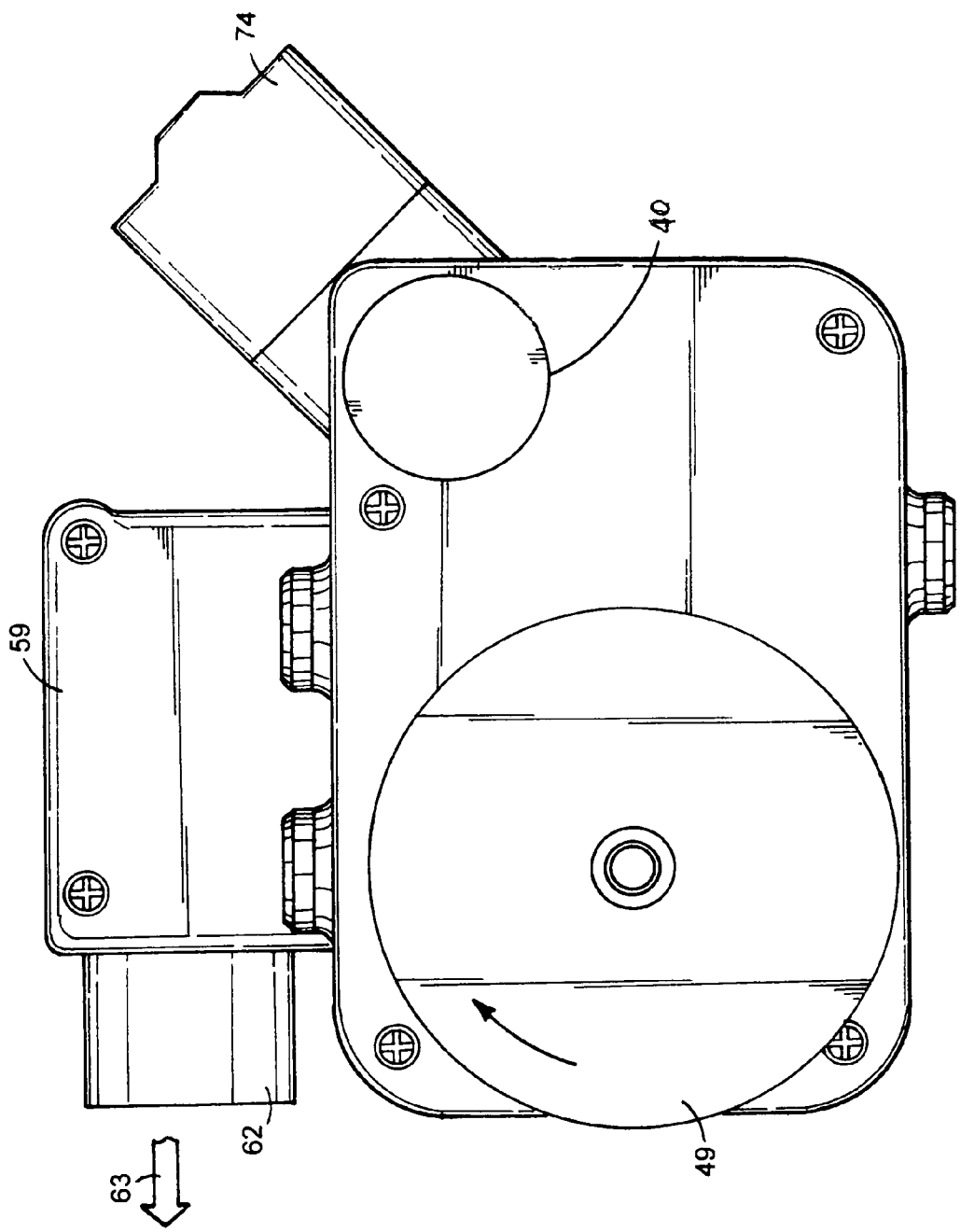
FIG. 5 is an elevational view of the rear end of the supercharger of FIG. 3.

As shown in FIGS. 3, 4, and 7, an inlet end plate 51 having a tubular end 52 is secured with fasteners 53 to end member 39. Tubular end 52 surrounds an air inlet passage 54 open to the air inlet ends of rotors 34 and 36. An air filter 56, shown in FIG. 1, mounted on tubular end 52 separates particulates from ambient air illustrated by arrow 57 and allows clean air to flow into passage 54 and to rotors 34 and 36.

Returning to FIGS. 3 to 6, a box shaped member or temple 59 mounted on top of housing 28 has an internal chamber 61 in air communication with opening 58 for directing air flow shown by arrow 63 through sleeve 62 into air cooler 19. Sleeve 62 can be connected directly to manifold 12 to supply air to engine 11 when air cooler 19 is not used.

Figure 8:
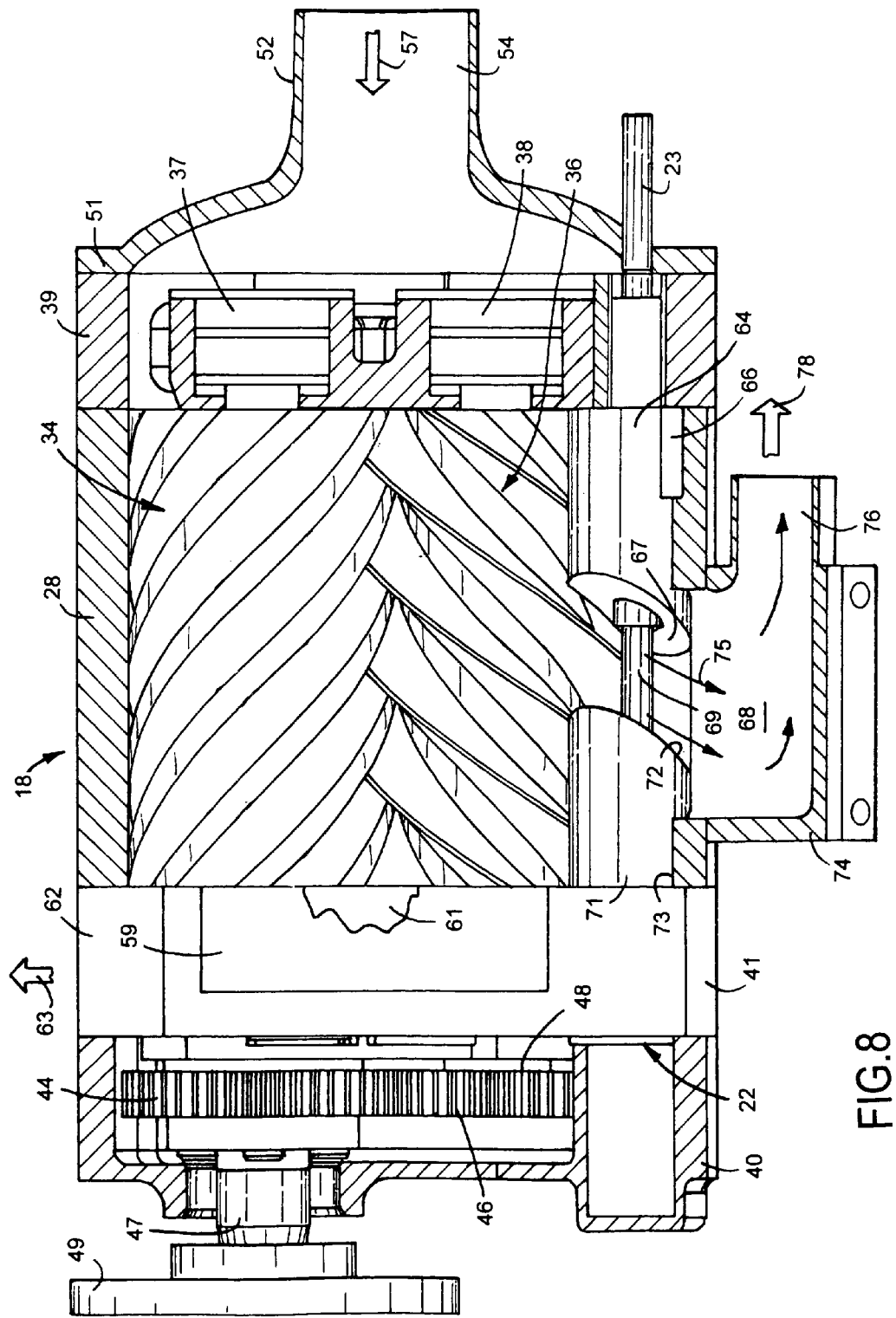
FIG. 8 is a sectional view the same as FIG. 7 showing the air control slide assembly in a partially air bypass position for allowing a selected volume of air to be discharged from the supercharger to the engine.
Figure 9:
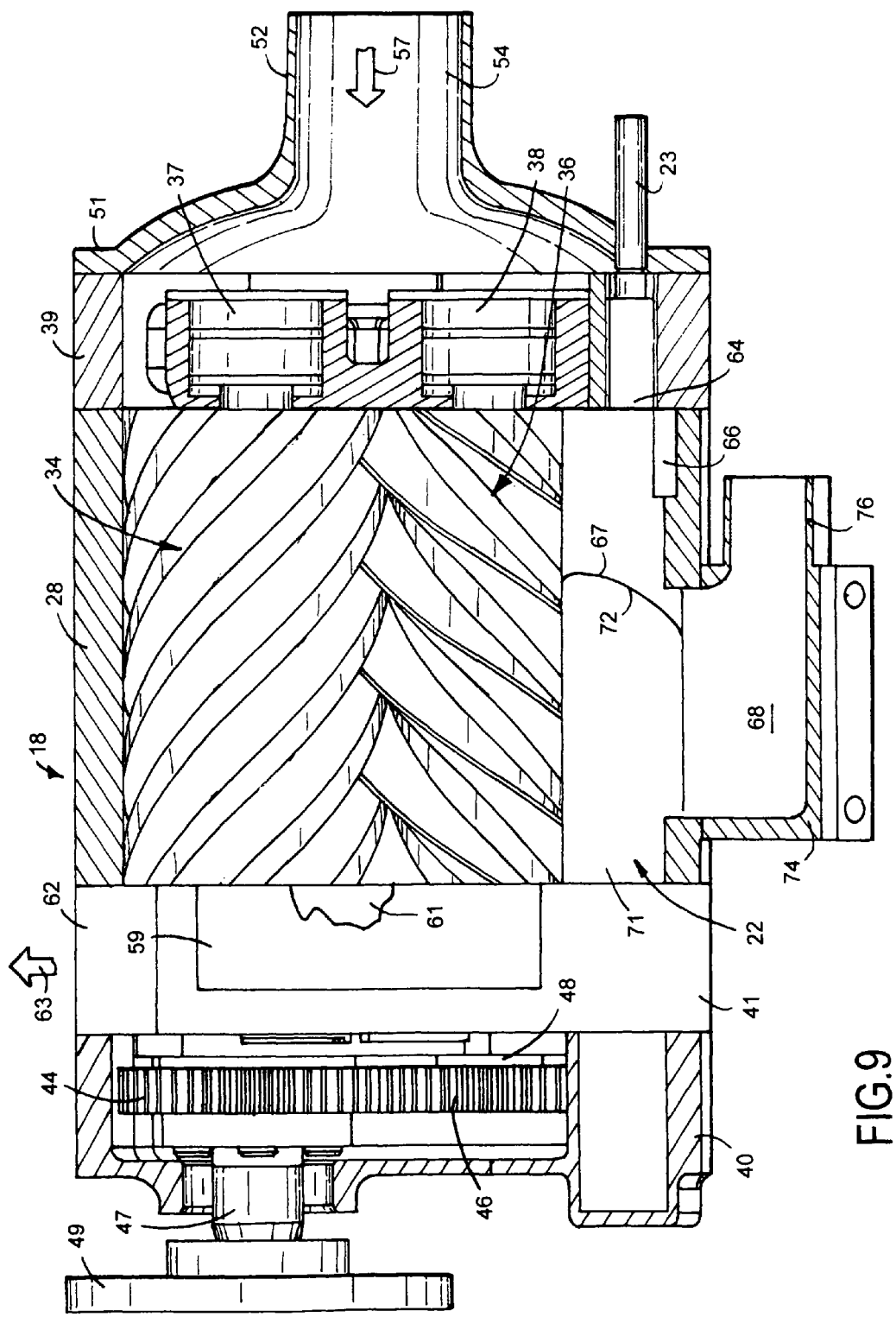
FIG. 9 is a sectional view the same as FIG. 7 showing the air control slide assembly in a minimum air bypass position for allowing a maximum volume of air to be discharged from the supercharger to the engine.

Air flow control slide assembly 22, shown in FIGS. 7, 8, and 9, has member 64 fixed to housing 28 with a pin 66. Member 64 may or may not be needed depending on length and movement of member 71. Member 64 has an inclined face 67 extended between rotor 36 and an air bypass passage 68 in the side of housing 28. Member 64 is optional and serves only to minimize the travel requirement of slide member 71 to achieve maximum air volume displacement or as required for manufacturability. Face 67 has an inclined surface that is generally complementary to the helical angle of the protrusions or vanes of rotor 36. Actuator 23 includes a rod 69 connected to a second slide or member 71. Rod 69 can be threaded into member 71 whereby rotation of rod 69 moves member 71 axially along a passage 73 in housing 28. Other devices and controllers, such as a servomotor, linear actuator, a solenoid or a foot pedal, can be used to adjust the position of member 71 relative to length of rotor 36. The front end of member 71 has an inclined face 72 that is generally parallel to face 67 on the rear end of member 64. The inclined faces 67 and 72 of members 64 and 71 facilitates flow of air, shown by arrows 75, from rotor 36 into air bypass passage 68. A manifold cap 74 mounted on housing 28 over air bypass passage 68 has a passage 76 directing air into a curved tube 77 to discharge air, shown by arrow 78 in FIG. 1, into the atmosphere. Tube 77 can be a muffler to inhibit noise. The air moved by rotors 34 and 36 keeps rotor surfaces and housing 28 cool as the air that is not directed to engine 11 is discharged through bypass passage 68 to atmosphere when control slide assembly 22 is in maximum air bypass, partially air bypass or minimum air bypass positions. The excess hot air is not recycled back to the intake end of rotors 34 and 36. Also, this lowers the temperature of the compressed air delivered to the engine.

Figure 10:
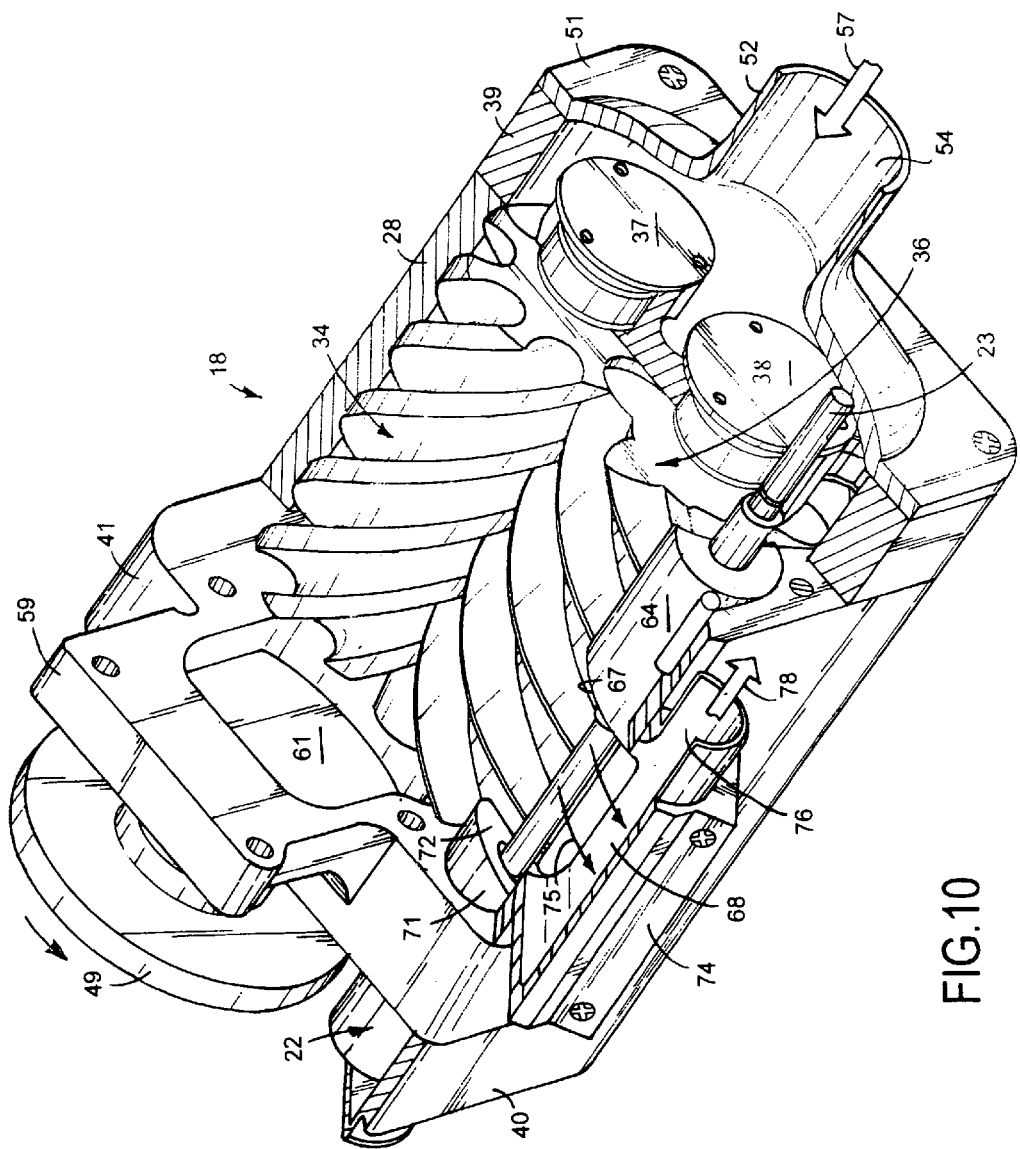
FIG. 10 is a perspective view partly sectioned of the supercharger showing the rotors and air control slide assembly in the maximum air bypass position.
Figure 11:
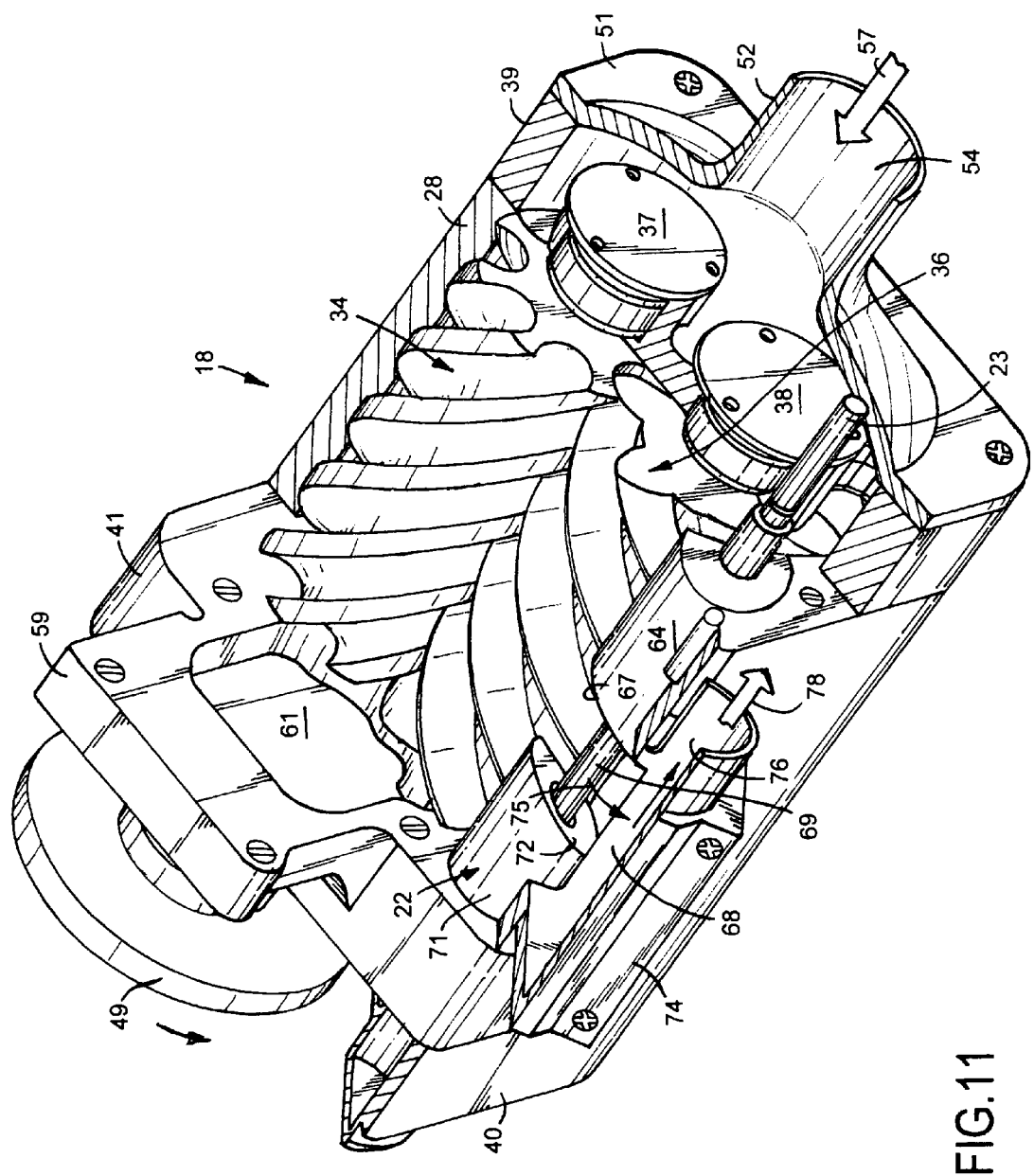
FIG. 11 is a perspective view partly sectioned of the supercharger showing the rotors and air control slide assembly in a partially air bypass position.
Figure 12:
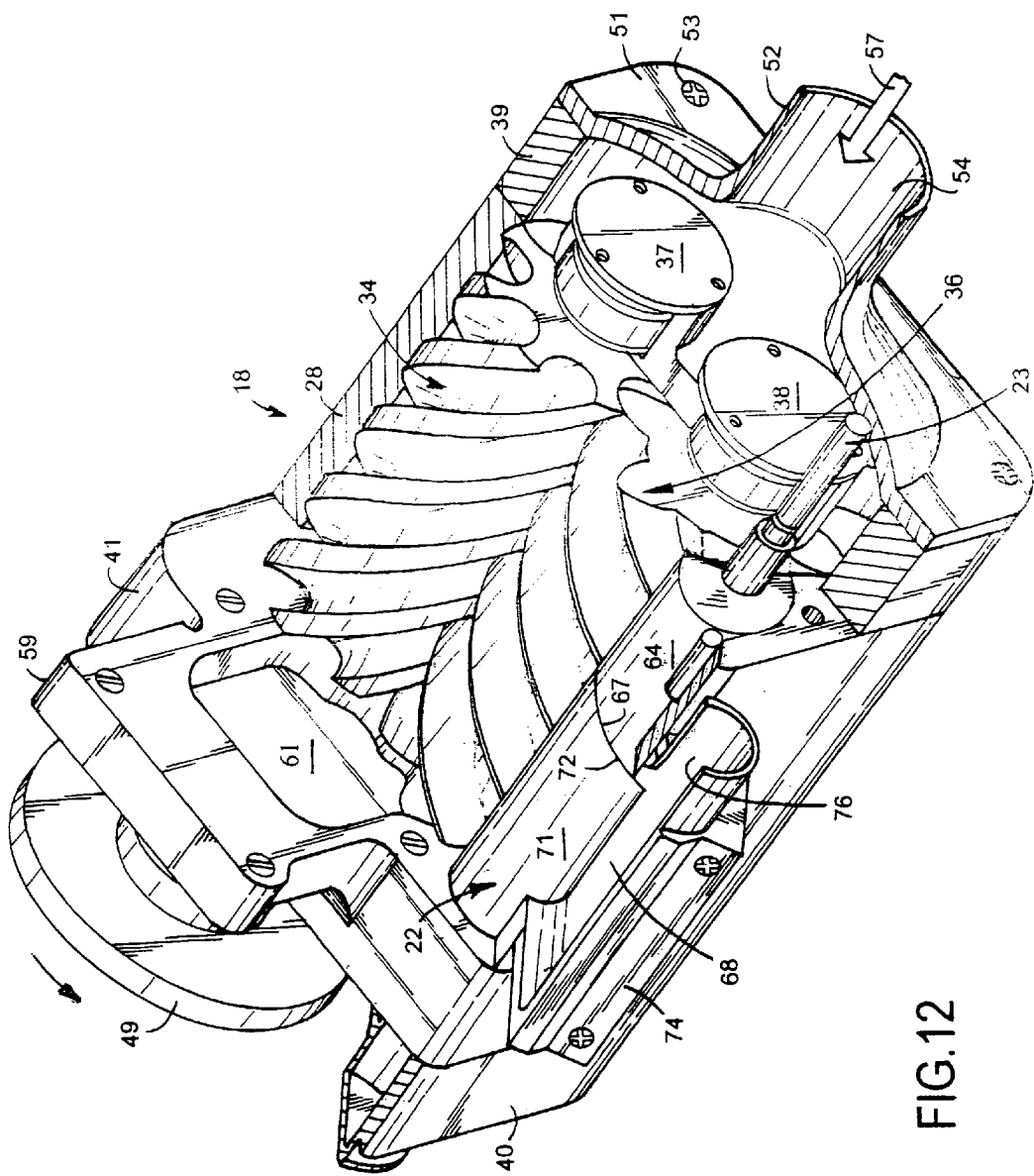
FIG. 12 is a perspective view partly sectioned of the supercharger showing the rotors and air control slide assembly in the minimum air bypass position.
Figure 13:
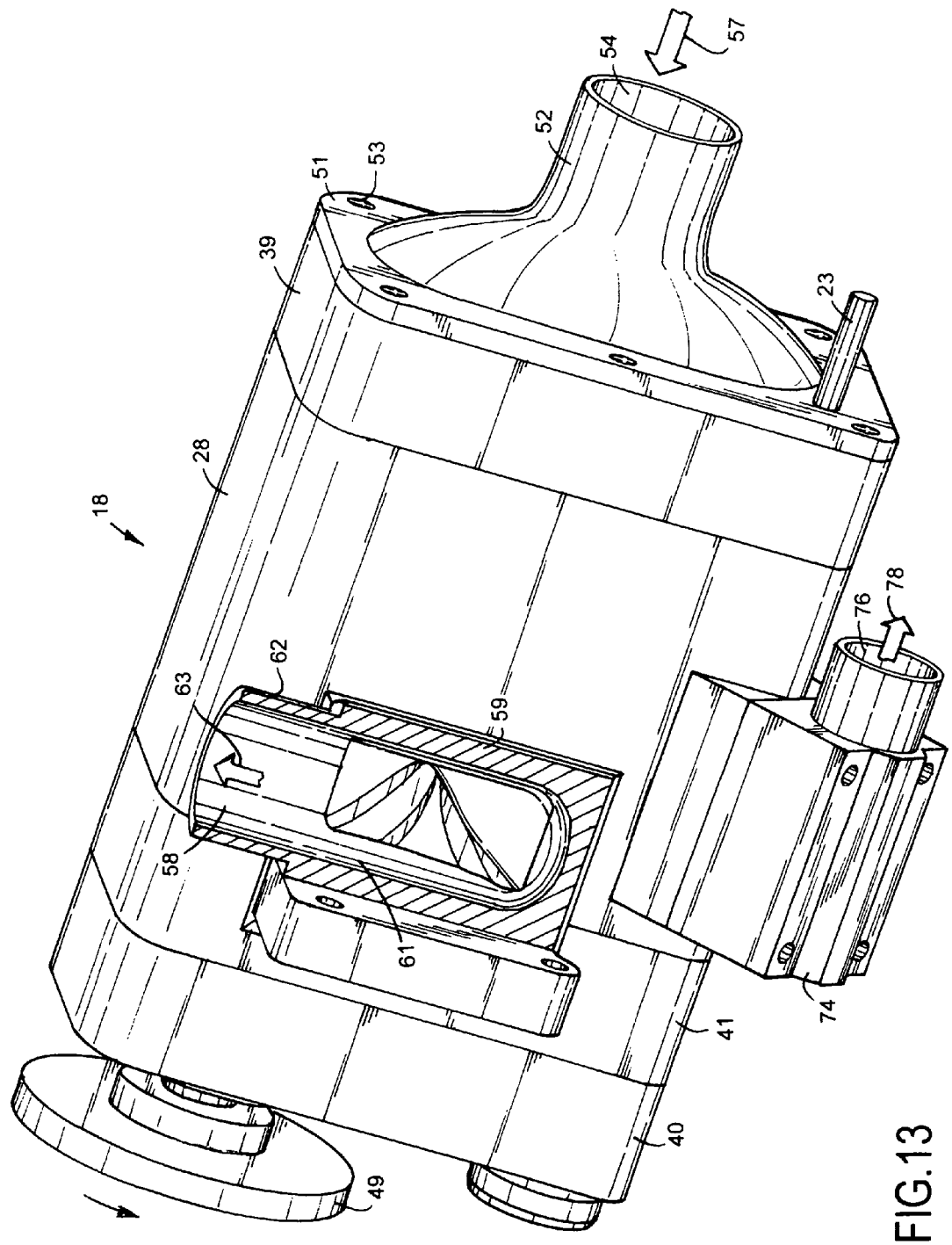
FIG. 13 is a top perspective view partly sectioned of the supercharger of FIG. 2.
Figure 14:
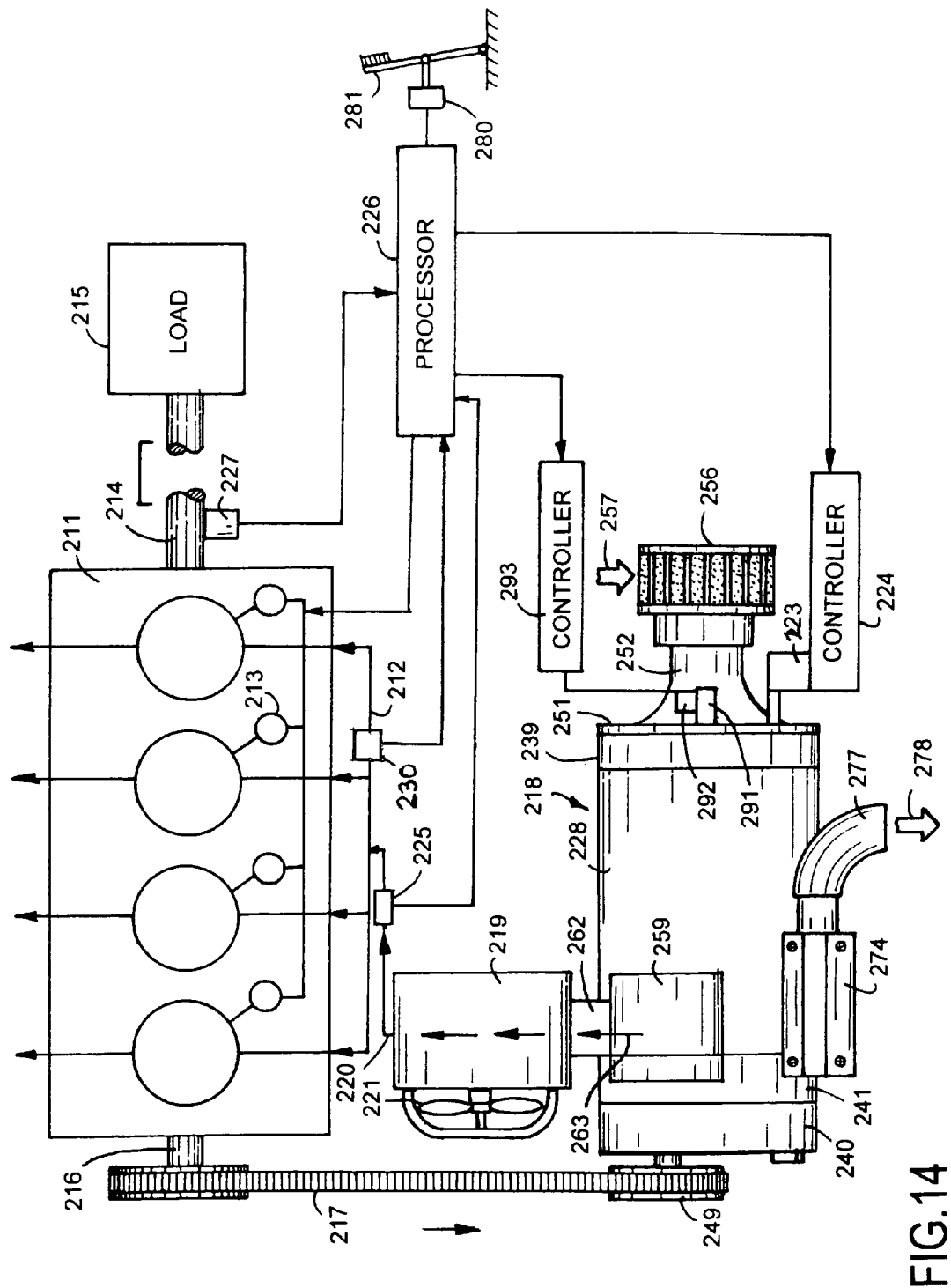
FIG. 14 is a diagram of an internal combustion engine coupled to a load and a modification of the supercharger of the invention.

The mass of air dispensed by supercharger 18 is changed or altered by adjusting the position of slide assembly 22 relative to rotor 36 to meet the power requirements of engine 11. Supercharger 18 being driven by engine 11 is responsive to the rotational speed or RPM of engine 11 to substantially match the rate of air flow delivered to engine 11 with the rate of air flow utilized by the engine. Supercharger 18 can be operated to vary the mass of air bypassed to atmosphere or to boost or increase the rate of air flow to engine manifold 12 and increase the mass and pressure of air directed to the engine's combustion cylinders. Air control slide assembly 22 is actuated with controller 24 between maximum air bypass, partially air bypass and minimum air bypass positions, shown in FIGS. 7 to 12, to regulate the amount of air expelled to atmosphere and the mass of air discharged by supercharger 18 to engine 11. As shown in FIGS. 7 and 10, movable member 71 of slide assembly 22 is in the maximum air bypass position allowing a minimum mass of air to be delivered to engine 11 with excess air being expelled through air bypass opening 68 to atmosphere. As rotors 34 and 36 rotate, the inlet excess air is bypassed to passage 68 and atmosphere until it is trapped by slide member 71. In the maximum air bypass position none of the trapped air undergoes an internal compression prior to delivery to chamber 61 and directed to engine manifold 12. Control slide assembly 22 in FIGS. 8 and 11 is in the partially air bypass position to allow a selected volume of air to be compressed by rotors 34 and 36 and delivered to engine 11. FIGS. 9 and 12 show control slide assembly 22 in the minimum air bypass position to allow a maximum volume of air to be compressed and discharged by the rotors 34 and 36 to engine 11. Air control slide assembly 22 is adjustable between its maximum air bypass, partially air bypass and minimum air bypass positions to vary the amount of air expelled to atmosphere and the pressure and mass of air compressed by rotors 34 and 36 to engine 11. The excess air moved by rotors 34 and 36 and directed to atmosphere through bypass passage 68 cools rotors 34 and 36 and housing 28 as the excess air transfers heat generated by the previous compressing of air by rotors 34 and 36. The excess air need not be recycled back to the air inlet of rotors 34 and 36. This also reduces the temperature of the compressed air directed to engine 11. Alternatively, the excess air can be recycled through an air cooler (not shown) back to air inlet 54 of supercharger 18.

The supercharger 18 achieves a method of varying the delivery of air to internal combustion engine 11 to efficiently operate the engine with minimum boost or varying levels of boost. A continuous volume of air is generated by the concurrent rotation of rotors 34 and 36. The excess or first portion of the generated mass of air is expelled or purged from supercharger 18 to atmosphere. This air is bypass air at nearly atmospheric pressure. A second portion of the generated mass of air is directed to the engine 11 in an amount required by the power requirements of the engine. The amount of the first portion of the mass of air expelled to atmosphere is controlled with slide assembly 22 to selectively vary the mass of the second portion of the air directed to the internal combustion engine 11. The second volume of air can be further cooled with air cooler 19 prior to introduction of the air to the internal combustion engine. The second mass of air can be directly dispensed into manifold 12 of engine 11 if air cooler 19 is not used.

A modification of the supercharger 218 of the invention, shown in FIGS. 14 to 20, is operatively driven with an internal combustion engine 211 having an air intake manifold 212, fuel injectors 213, and a power output drive shaft 214. Shaft 214 is operably connected to a load 215. Load 215 is an apparatus such as an electric generator, a pump, a vehicle drive system or a machine for receiving power from engine 211. A front drive shaft 216 of engine 211 is connected to a power transmission 217 that drives a supercharger 218. Engine 211 is a diesel-like engine. Air is discharged from supercharger 218 into an air cooler 219 coupled to manifold 212 with a conduit 220. A vehicle motion or motor driven fan 221 mounted on air cooler 219 moves combined air through air cooler to increase the cooling of air moving through air cooler 219. Supercharger 218 can be connected directly to intake manifold 212 to dispense air to engine 211 if air cooler 219 is not used. An air mass flow sensor 225 coupled to conduit 220 provides electric signals to a processor 226.

The volume of air bypassed to atmosphere and moved by supercharger to engine 211 is regulated with an air control slide assembly 222 located within supercharger 218. Slide assembly 222 includes a slide or member 271 movable between maximum air bypass, partially air bypass and minimum air bypass positions with an actuator 223. A controller 224 operatively coupled to actuator 223 operates actuator 223 which in turn moves the member 271 between maximum air bypass, partially air bypass and minimum air bypass positions to regulate the volume of air flow from supercharger 218 to engine 211.

Controller 224 operably connected to actuator 223 is wired to a processor 226 that directs the operation of controller 224. Processor 226 is also wired to air mass flow sensor 225. A sensor 227 operable to generate signals responsive to the speed of rotation of drive shaft 214 provides processor 226 with data signals which are processed by the electronic components of processor 226 to provide control or command signals that operate controller 224 which in turn starts actuator 223 to change the position of slide assembly 222 to regulate the volume of air bypassed to atmosphere and the volume of air compressed and dispensed by supercharger 218 to engine 211. A manually operated device 280 is operable to provide manual input to processor 226 to change the positions of control slide assembly 222 to regulate the volume of air bypassed to atmosphere and discharged to engine 211. Air mass flow sensor 225 also provides electric signals to processor 226 to regulate the control slide assembly 222 and discharge of fuel into the combustion chamber of the engine.

Supercharger 218, shown in FIGS. 15 to 19, has a housing 228 with a pair of parallel cylindrical walls 229 and 232 surrounding cylindrical chambers 231 and 233. The chambers 231 and 233 have interesting adjacent arcuate sections. A female screw or rotor 234 extended along chamber 231 cooperates with a male screw or rotor 236 located in chamber 233 to move air along the lengths of rotors 234 and 236. Rotors 234 and 236 have the same grooves and protrusions or lands as rotors 34 and 36. Other sizes, shapes and lengths of rotors can be used in supercharger 218. Rotors 234 and 236 are concurrently rotated by engine 211 with power transmission 217 coupled with spur gears 244 and 246, connected to rotor shafts 247 and 248 surrounded by housing 240. Rotors 234 and 236 are rotated at rotational speeds related to the rotational speed of the engine's drive shaft 216. A separate drive device, such as an electric motor, can be used to rotate rotors 234 and 236.

Returning to FIG. 19, end members 239 and 241 secured to opposite ends of housing 228 support bearings 237 and 238 accommodating the rotor shafts. An air inlet plate 251 having a tubular end 252 is secured to end member 239 with fasteners 253. Tubular end 252 has an air inlet passage 254 open to the air inlet ends of rotors 234 and 236 to allow air, shown by arrow 257, to flow into supercharger 218. An air filter 256, shown in FIG. 14, mounted on tubular end 252 separates particulates from the ambient air drawn through air filter 256 into air inlet passage 254. Other types of air cleaners can be used to remove foreign materials from the air flowing into supercharger 218.

Figure 15:
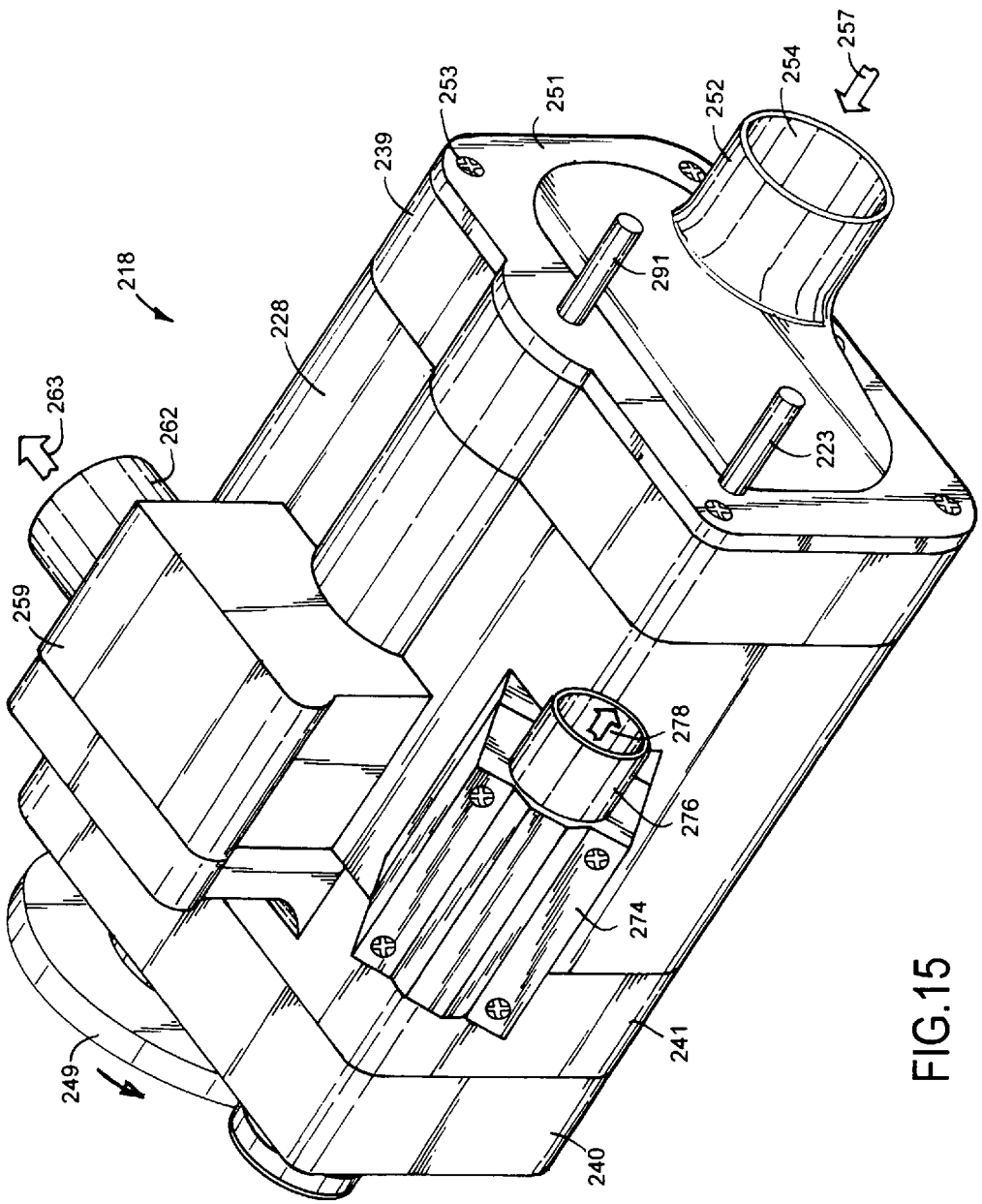
FIG. 15 is an enlarged perspective view of the supercharger of FIG. 14.
Figure 16:
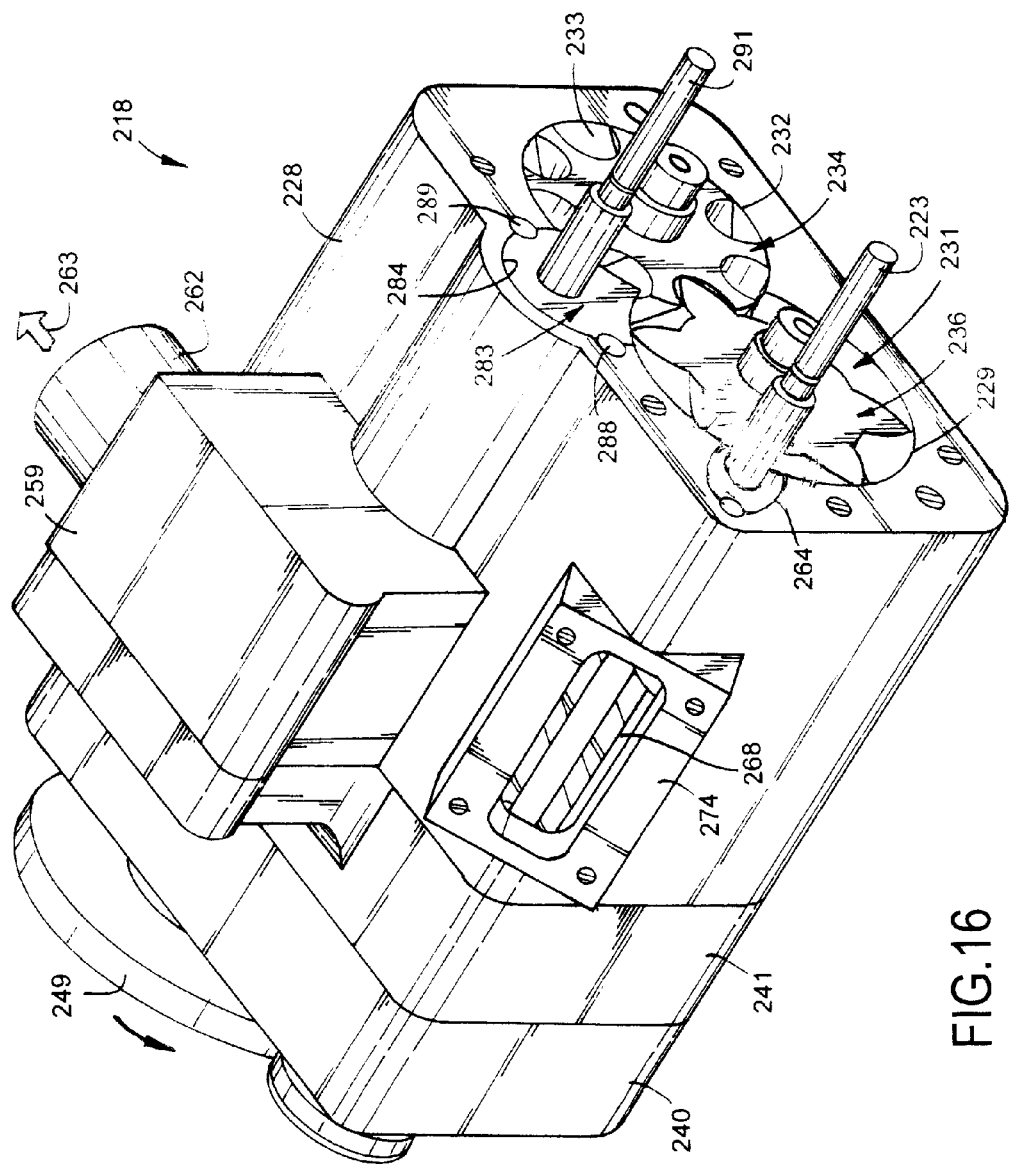
FIG. 16 is a perspective view of the supercharger of FIG. 15 showing the rotors.
Figure 20:
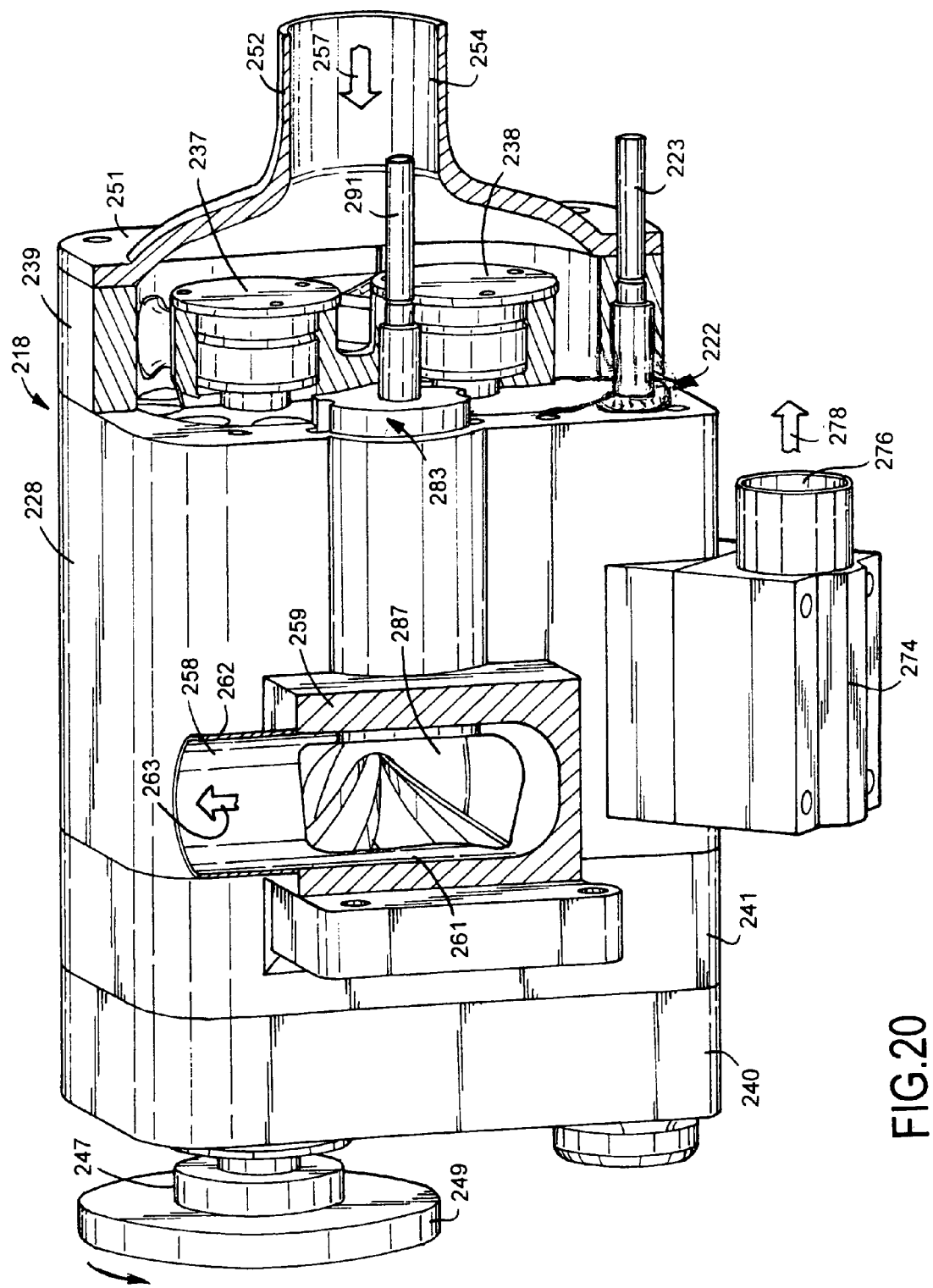
FIG. 20 is a top perspective view partly sectioned of the supercharger of FIG. 15.

As shown in FIGS. 15, 16 and 20, a temple or box shaped member 259 mounted on housing 228 has an internal passage 261 in communication with the rear ends of chambers 231 and 233 for receiving air compressed by rotors 234 and 236. The air, shown by arrow 263, flows through passage 258 in sleeve 262 into air cooler 219 and from air cooler into engine 211. Sleeve 262 can be directly connected to manifold 212 of engine 211 to supply air from supercharger 218 to engine 211. The air from air cooler 219 flows into an air mass flow sensor 225 interposed in conduit 220. Air mass flow sensor 225 provides electric signals to a processor 226 that controls supercharger 218 and the fuel discharged into combustion chambers of the engine 211.

Figure 17:
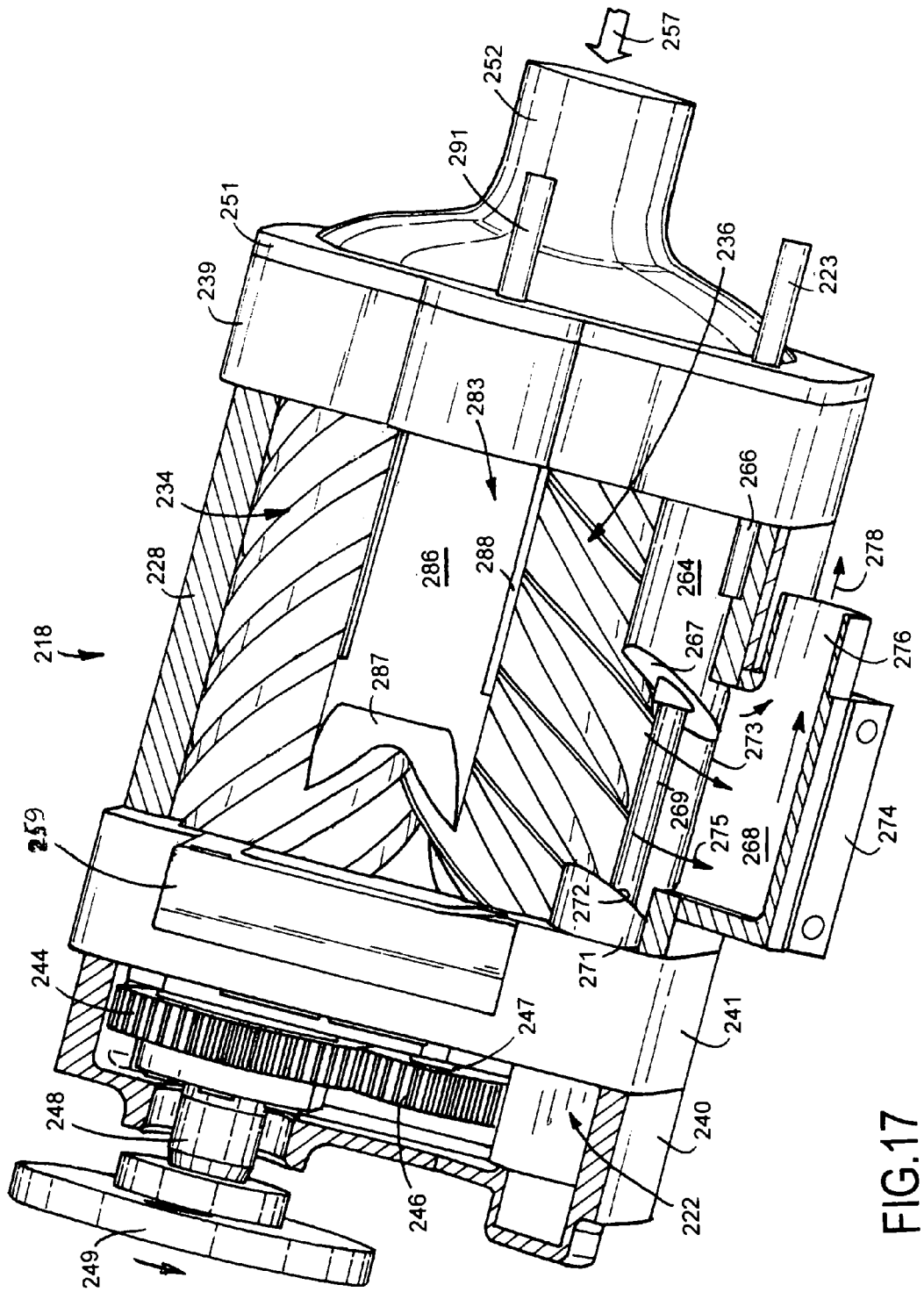
FIG. 17 is a top perspective view partly sectioned of the supercharger of FIG. 15 showing the rotors, the air control slide assembly in the maximum air bypass position and the volume ratio control slide assembly.
Figure 18:
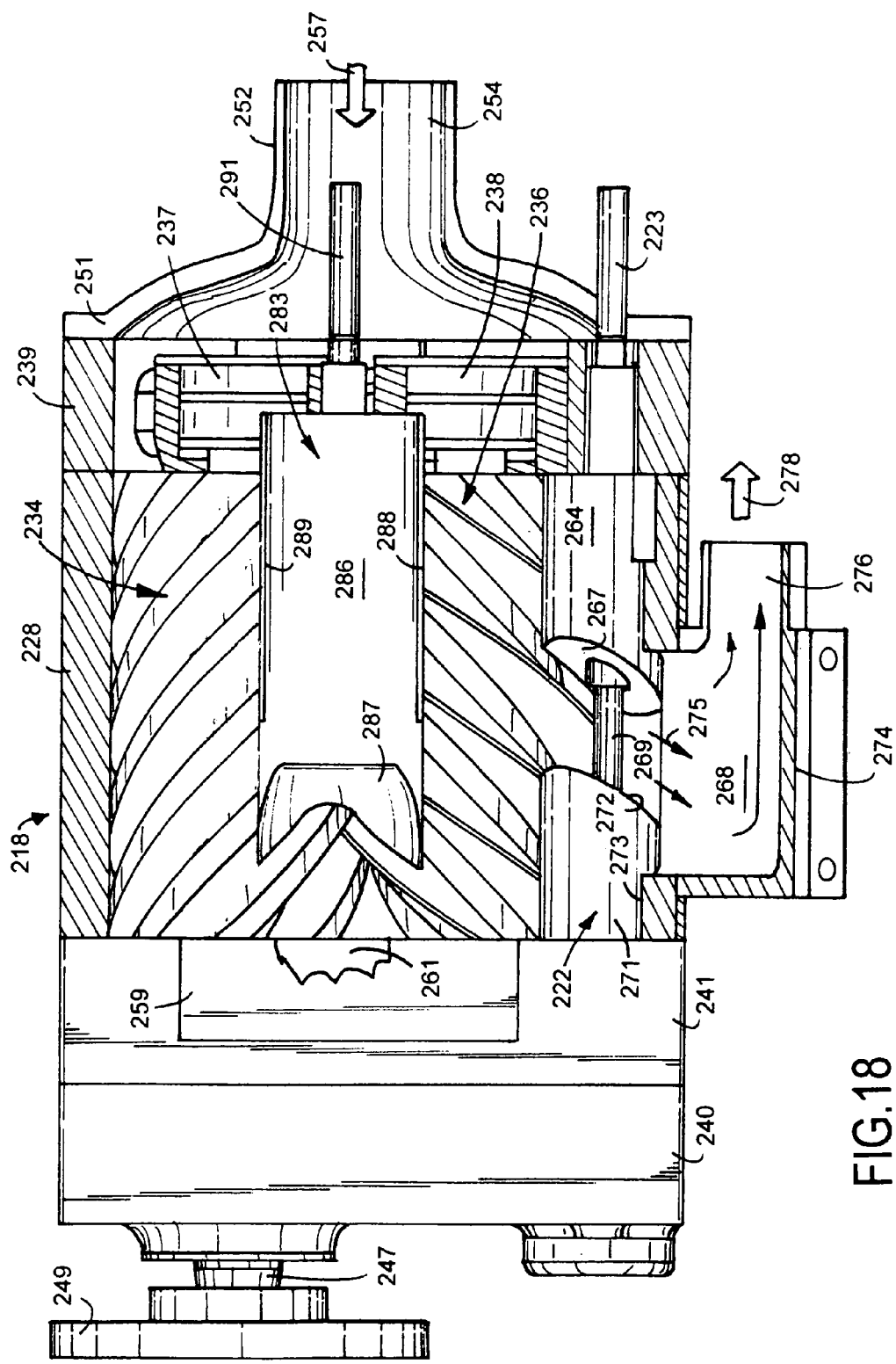
FIG. 18 is a top plan view partly sectioned of the supercharger of FIG. 15 showing the rotors, the air control slide assembly in the partially air bypass position and the volume ratio control slide assembly.
Figure 19:
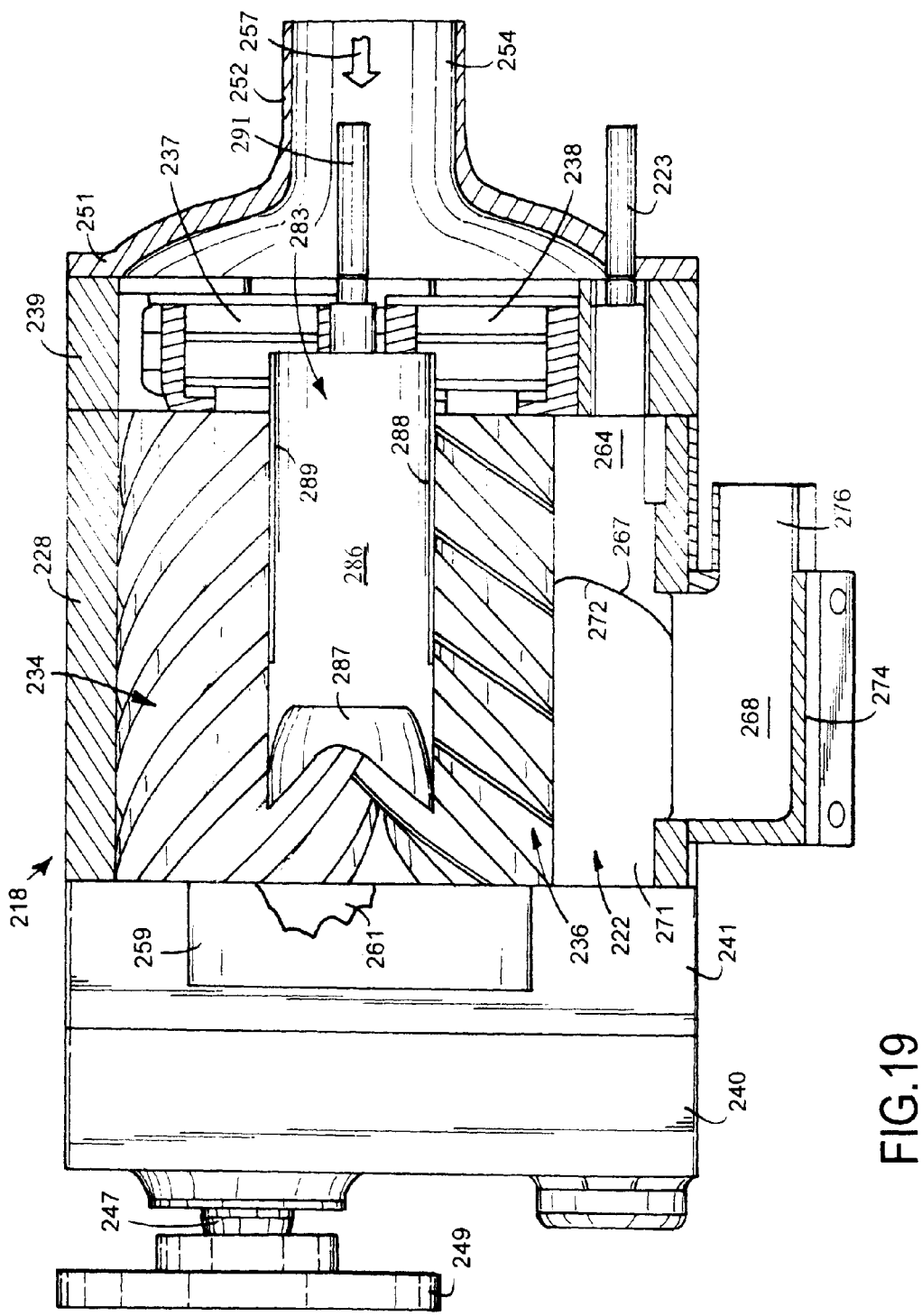
FIG. 19 is a top plan view partly sectioned of the supercharger of FIG. 15 showing the rotors, the air control slide assembly in the minimum air bypass position and the volume ratio control slide assembly.

Air flow control slide assembly 222, shown in FIGS. 17 to 19, has a first slide or member 264 fixed to housing 228 with a pin 266 and a second slide or member 271 axially aligned with first member 264. Members 264 and 271 have the same structure as slide members 64 and 71. Member 271 is axially moveable in a bore 273 in housing 222 adjacent a side of rotor 236. A control rod 269 extended through member 264 is operatively connected to member 271 to axially move member 271 relative to member 264 to maximum air bypass, partially air bypass and minimum air bypass positions, shown in FIGS. 17, 18 and 19, relative to an air bypass passage 268 in communication with atmosphere. When member 271 is in the maximum air bypass position, shown in FIG. 17, a first portion of air moved by rotors 234 and 236 is delivered into passage 268 to atmosphere, as shown by arrow 278. A second portion of air is moved to the engine's combustion chambers. The bypassed air is not recycled back to the air inlet of rotors 234 and 236. Alternatively, the excess air can be recycled through an air cooler back to the air inlet 254 of supercharger 218. The air moved by rotors 234 and 236 that is expelled through bypass passage 268 cools rotors 234 and 236 and adjacent housing 228. This also lowers the temperature of the air directed to the combustion chambers of engine 211. Control slide assembly 222, shown in FIG. 19, is in the minimum air bypass position whereby a maximum mass of air is delivered to engine 211 by rotors 234 and 236. When control slide assembly 222 is in the maximum air bypass position, shown in FIG. 17, a minimum mass of air is discharged to engine 211 and maximum mass of excess air, shown by arrows 275, is expelled to atmosphere through bypass passage 268. As shown in FIGS. 16 to 19, bypass passage 268 is covered with a cap 274 connected to a sleeve that directs air, shown by arrow 278, into a curved tube 277 to atmosphere. Tube 277 can include a muffler to inhibit noise. Member 271 of air control slide assembly 222 is moved with actuator 223 between maximum air bypass, partially air bypass and minimum air bypass positions to vary the opening between members 264 and 271 to change the mass of air flowing into air bypass passage 268 and to atmosphere and the mass of air directed to the combustion chambers of the engine. This adjustment of member 271 selectively increases or decreases the mass of air compressed and directed by supercharger 218 to engine 211 according to the power requirements of engine 211.

A second slide assembly 283 is axially moveable along a channel 284 in housing 228 open to the top of the intersecting cleavage portions of chambers 231 and 233 to regulate the volume ratio of the discharged air compressed by supercharger 218 to engine 211. Air control slide assembly 283 has an elongated body 286 having a convex curved top and a downwardly directed V-shaped bottom located in the cleavage between rotors 234 and 236. The rear or air outlet end has a downwardly and rearwardly directed end wall 287 facing passage 261 in box shaped member 259 to allow air to flow from rotors 234 and 236 into passage 261. Guide rails 288 and 289 cooperating with opposite sides of body 286 support body 286 on housing 228 for linear movement relative to rotors 234 and 236. An axial rod 291 connects body 286 to an actuator 292 operable to move body 286 relative to rotors 234 and 236 to change the volume ratio of air compressed and discharged by supercharger 218 to engine 211. Returning to FIG. 14, controller 293 wired to processor 226 operates actuator 292 in response to a program dictated by processor 226 and signals from a manifold pressure sensor 230 and an air mass flow sensor 225 in conduit 220. The air mass flow sensor can be located in air passage 258 of sleeve 262. The volume of air directed to engine 211 and purged through bypass opening 268 to atmosphere is regulated with air control slide assembly 222 according to the power requirements of engine 211.

Supercharger 18, shown in FIGS. 7, 8 and 9, has one air flow control slide assembly 22 coupled to an actuator 23 operable to control maximum air bypass, partially air bypass and minimum air bypass positions of slide assembly 22 to regulate a first portion of air bypassed to atmosphere and to supply a second portion of air to the intake manifold of the engine to meet the load requirements of the engine. A second air flow control slide assembly can be included in the supercharger coupled to an actuation to control maximum air bypass, partially air bypass and minimum air bypass positions of the slide assembly. The second slide assembly can be located adjacent rotor 34 and open to chamber 33 to allow air to bypass to atmosphere. The second slide assembly has the same structures and functions as slide assembly 22. Processor 26 via a controller operates the actuator to control the maximum air bypass, partially air bypass and minimum air bypass positions of the slide assembly.

The invention has been shown and described with reference to preferred embodiments of positive displacement air superchargers for diesel and diesel-like internal combustion engines and methods of providing power to power users. Modifications of the superchargers, air flow control slide assemblies and methods can be made by persons skilled in the art without departing from the invention.

The invention claimed is:

1. A supercharged internal combustion engine comprising:
 a diesel internal combustion engine having at least one combustion chamber,
 a supercharger for supplying air to the combustion chamber of the internal combustion engine,
 the supercharger includes a housing having a pair of chambers and an axial passage located adjacent one of the chambers,
 said axial passage having an air bypass opening open to one of the chambers and atmosphere,
 a pair of rotors rotatable about parallel axes located in the chambers operable to move air through the housing to atmosphere and to the combustion chamber of the engine, and
 an air flow control apparatus operable to vary the mass and pressure of the air supplied to the combustion chamber of the internal combustion engine responsive to the power requirements of the internal combustion engine to vary the rate of flow of air delivered to the combustion chamber of the internal combustion engine at or above the naturally aspirated rate of air flow into the combustion chamber of the internal combustion engine,
 said air flow control apparatus including a slide assembly axially movable in the passage in the housing for axial movement between maximum air bypass, partially air bypass and minimum air bypass positions relative to the axes of rotation of the rotors and said air bypass opening whereby a first portion of air moved by the rotors when the slide assembly is in the maximum air bypass and partially air bypass positions is directed uncompressed to atmosphere and a second portion of the air moved by the rotors is directed to the combustion chamber of the engine,
 an actuator operably connected to the slide assembly to selectively move the slide assembly between maximum air bypass, partially air bypass and minimum air bypass positions to vary the second portion of air directed to the combustion chamber of the internal combustion engine, thereby selectively increasing or decreasing the mass of air and associated internal compression ratio of the air moved by the rotors to the combustion chamber of the internal combustion engine,
 a power transmission drivably connecting the internal combustion engine to the rotors of the supercharger whereby the internal combustion engine operates the supercharger to generate a supply of air,
 a fuel injector for introducing fuel into the air in the combustion chamber of the internal combustion engine corresponding to the rate of flow of air delivered to the combustion chamber of the internal combustion engine by the supercharger,
 a sensor for providing signals representative of the load requirements of the internal combustion engine, and
 a control processor configured to;
 responsive to the signals from the sensor, provide command signals for operating the actuator and control the fuel injector to regulate the amount of fuel introduced into the combustion chamber and the timing of the fuel injection into the combustion chamber of the internal combustion engine.

2. The supercharged internal combustion engine of claim 1 wherein:
 the rotors comprise a male screw rotor and a female screw rotor and
 said air bypass opening being open to a side portion of the chamber accommodating the male screw rotor.

3. The supercharged internal combustion engine of claim 1 wherein:
 the slide assembly comprises a movable first member and a second member,
 said air bypass opening having a portion thereof located between said first and second members,
 said actuator being operably connected to the first member to move the first member relative to the second member to maximum air bypass, partially air bypass and minimum air bypass positions relative to the air bypass opening.

4. The supercharged internal combustion engine of claim 1 including:
 a second air control slide assembly operable to control the volume ratio of air moved by the rotors through the housing.

5. The supercharged internal combustion engine of claim 1 wherein:
 the housing has a pair of chambers,
 said rotors being located in said chambers,
 a channel in the housing open to said pair of chambers,
 an air control slide member movably located in said channel for controlling the volume ratio of air moved by the rotors through the housing, and
 a second actuator operably connected to the air control slide member to move the air control slide member relative to the rotors, said second actuator being coupled to the processor whereby command signals from the processor controls the operation of the second actuator.

6. The supercharged internal combustion engine of claim 5 wherein:
 the rotors comprise a male screw rotor and a female screw rotor.

7. The supercharged internal combustion engine of claim 1 including:
an air cooler for cooling the air as it flows between the supercharger and the combustion chamber of the internal combustion engine.

8. The supercharged internal combustion engine of claim 1 including:
an air mass flow sensor operable to generate an air mass flow signal of the air flowing from the supercharger to the combustion chamber of the internal combustion engine, said air mass flow signal being directed to the processor which controls the apparatus to regulate the amount of fuel injected into the combustion chamber of the internal combustion engine.

9. A supercharged internal combustion engine for supplying air to the engine comprising:
an internal combustion engine having at least one combustion chamber for accommodating air under pressure and fuel,
a supercharger for supplying air to the combustion chamber of the engine according to the load requirements of the engine,
the supercharger includes a housing having a housing chamber and an axial passage located adjacent said housing chamber,
rotors located in the housing chamber in-the housing operable to move air through the supercharger to atmosphere and to the combustion chamber of the engine,
said axial passage in the housing including an air bypass opening open to the housing chamber and atmosphere,
an air flow control apparatus including a slide assembly on axially movable in tile passage in the housing for axial movement between maximum air bypass, partially air bypass and minimum air bypass positions relative to the rotors and air bypass opening whereby a first portion of air moved by the rotors is expelled uncompressed from said chamber to atmosphere through the air bypass opening when the slide assembly is in the maximum air bypass and partially air bypass positions and a second portion of the air moved by the rotor is directed to the combustion chamber of the internal combustion engine,
an actuator operably connected to the slide assembly to selectively axially move the slide assembly between maximum air bypass, partially air bypass and minimum air bypass positions to vary the volume of the second portion of air directed to the combustion chamber of the internal combustion engine thereby selectively increasing or decreasing the mass of air and associated internal compression ratio of the air moved by the rotors to the combustion chamber of the engine,
synchronizing gears for rotating the rotors to generate a supply of air,
a fuel injector for introducing fuel into the air in the combustion chamber corresponding to the rate of flow of air directed to the combustion chamber of the engine by the supercharger,
a control processor configured to;
responsive to the load requirements of the engine, operate the actuator to regulate the position of the slide assembly, control the amount of air directed to the combustion chamber of the engine, and control the fuel injector to regulate the amount of fuel introduced into the combustion chamber.

10. The supercharged internal combustion engine of claim 9 wherein:
the rotors comprise a male screw rotor and a female screw rotor and said air bypass opening being open to a side portion of the chamber accommodating the male screw rotor.

11. The supercharged internal combustion engine of claim 9 wherein:
the slide assembly comprises a movable first member and a second member,
said air bypass opening having a portion thereof located between said first and second members,
said actuator being operably connected to the first member to move the first member relative to the second member to maximum air bypass, partially air bypass and minimum air bypass positions relative to the air bypass opening.

12. The supercharged internal combustion engine of claim 9 including:
a second air control slide assembly operable to control the volume ratio of air moved by the rotors through the housing.

13. The supercharged internal combustion engine of claim 9 wherein:
the housing has a channel open to said chamber,
an air control slide member movably located in said channel for controlling the volume ratio of air moved by the rotors through the housing, and
a second actuator operably connected to the air control slide member to move the air control slide member relative to the rotors, said second actuator being coupled to the processor whereby command signals from the processor controls the operation of the second actuator.

14. The supercharged internal combustion engine of claim 13 wherein:
the rotors comprise a male screw rotor and a female screw rotor.

15. The supercharged internal combustion engine of claim 9 including:
an air cooler for cooling the air as it flows between the supercharger and the combustion chamber of the internal combustion engine.

16. The supercharged internal combustion engine of claim 9 including:
an air mass flow sensor operable to generate an air mass flow signal of the air flowing from the supercharger to the combustion chamber of the internal combustion engine, said air mass flow signal being directed to the processor which controls the fuel injector to regulate the amount of fuel injected into the combustion chamber of the internal combustion engine.

17. A supercharged internal combustion engine comprising:
an internal combustion engine having an air intake manifold for air near or above atmospheric pressure and at least one combustion chamber,
a supercharger for supplying air to the combustion chamber of the internal combustion engine,
a power transmission drivably connecting the internal combustion engine to the supercharger whereby the internal combustion engine operates the supercharger to generate a supply of air,
said supercharger including an air flow control apparatus operable to vary the mass and pressure of the air supplied to the combustion chamber of the internal combustion engine responsive to the load requirements of the internal combustion engine to vary the rate of flow of air delivered to the combustion chamber of the internal combustion engine near or above the naturally aspirated rate of air flow into the combustion chamber of the internal combustion engine, said supercharger having an internal chamber with an air inlet opening, an air outlet opening and a passage having an air bypass opening between the air inlet opening and air outlet opening, said air outlet opening being in air flow communication with the combustion chamber of the internal combustion engine, said bypass opening in air flow communication with a low air pressure location, a rotor located in the chamber operable to move air from the air inlet opening to the air outlet opening and to the air bypass opening, said air flow control apparatus including a member located in the passage and movable axially relative to the rotor toward the air inlet opening between maximum air bypass, partially air bypass and minimum air bypass positions relative to the rotor and the bypass opening whereby a first portion of air moved by the rotor is expelled uncompressed through the bypass opening to the low pressure location when the member is in the maximum air bypass and partially air bypass positions and the remainder of the air moved by the rotor is directed to the combustion chamber of the internal combustion engine, an actuator operably connected to the member to selectively move the member axially relative to the rotor between maximum air bypass, partially air bypass and minimum air bypass positions to vary the amount of the remainder of air directed to the combustion chamber of the internal combustion engine, and a fuel injector for introducing fuel into the air in the combustion chamber of the internal combustion engine corresponding to the rate of flow of air delivered to the combustion chamber of the internal combustion engine by the supercharger.

18. The supercharged internal combustion engine of claim 17 wherein:

the supercharger includes a housing having a pair of chambers, said passage and air bypass opening open to one of the chambers and atmosphere, and a pair of rotors located in the chambers in the housing.

19. The supercharged internal combustion engine of claim 17 including:

an air cooler for cooling the air as it flows between the supercharger and the combustion chamber of tile internal combustion engine.

20. The supercharged internal combustion engine of claim 17 including:

a sensor for providing signals representative of the power requirements of the engine, and a control processor configured to:

responsive to the signals from the sensor, provide command signals for operating the actuator and control the amount of fuel injected into the combustion chamber and the timing of the fuel introduced into the air in the combustion chamber.

21. The supercharged internal combustion engine of claim 17 wherein:

the supercharger includes a housing having a pair of chambers and a channel open to the pair of chambers, a pair of rotors located in said chambers, an air control slide member movably located in said channel for controlling the volume ratio of air moved by the rotors through the housing, and an actuator connected to the air control slide member operable to move the air control slide member relative to said rotors thereby controlling the volume ratio of air moved by the rotors.

22. A supercharged internal combustion engine comprising:

an internal combustion engine having an air intake manifold for air near or above atmospheric pressure and at least one combustion chamber adapted to be operatively connected to a load, a supercharger operable to supply air to the engine, a power transmission operably connecting the engine to the supercharger whereby the supercharger is operated responsive to the speed of the engine, the supercharger comprising a housing having generally parallel chambers and a passage parallel to the chambers, said passage having an air bypass opening open to atmosphere, a pair of rotors located in the chambers operatively connected to the power transmission to rotate the rotors whereby the rotors move air to the engine, a slide assembly having a member located in the passage adjacent one rotor, said member being movable between maximum air bypass, partially air bypass and minimum air bypass positions relative to the air bypass opening to control the amount of uncompressed air discharged by rotors through the air bypass opening to atmosphere and the balance of compressed air moved by the rotors to the combustion chamber of the engine, and a sensor operable to generate a signal corresponding to the power requirements of the engine, an actuator connected to the member operable to move the member in the passage axially relative to the one rotor between maximum air bypass, partially air bypass and minimum air bypass positions, and a control processor configured to:

responsive to the signal from the sensor, provide command signals that operate the actuator, move the member between maximum air bypass, partially air bypass and minimum air bypass positions and control the amount of fuel injected into the combustion chamber and the start of the timing of the fuel injection into the combustion chamber.

23. The supercharged internal combustion engine of claim 22 including:

an air cooler operatively connected to the supercharger and engine for cooling air flowing from the supercharger to the engine.

24. The supercharged internal combustion engine of claim 22 wherein:

the pair of rotors comprise a male screw, a female screw, and the member of the slide assembly located in said passage in the housing whereby when the member is in a maximum air bypass or partially air bypass position excess uncompressed air pumped by the screws flows through the bypass opening to atmosphere.

25. The supercharged internal combustion engine of claim 22 wherein:

said housing has a channel open to said parallel chambers, an air control slide member movably located in said channel for controlling the volume ratio of air moved by the rotors to the combustion chamber of the engine, and an actuator connected to the air control slide member operable to move the air control slide member relative to said rotors thereby controlling the volume ratio of air moved by the rotors.

* * * * *